United States Patent
Clem

(10) Patent No.: US 9,747,577 B1
(45) Date of Patent: Aug. 29, 2017

(54) AUTOMATIC GUARANTEE DELIVERY TRACKING AND REPORTING FOR UNITED STATES POSTAL SERVICE POSTAGE REFUNDS FOR PAID COMPUTER-BASED POSTAGE

(71) Applicant: STAMPS.COM INC., El Segundo, CA (US)

(72) Inventor: John Roland Clem, Hermosa Beach, CA (US)

(73) Assignee: Stamps.com Inc., El Segundo, CA (US)

( * ) Notice: Subject to any disclaimer, the term of this patent is extended or adjusted under 35 U.S.C. 154(b) by 314 days.

(21) Appl. No.: 14/750,623

(22) Filed: Jun. 25, 2015

Related U.S. Application Data

(63) Continuation of application No. 12/500,970, filed on Jul. 10, 2009, now Pat. No. 9,082,234.

(51) Int. Cl.
*G06Q 10/08* (2012.01)
*G06Q 20/40* (2012.01)

(52) U.S. Cl.
CPC ......... *G06Q 10/083* (2013.01); *G06Q 20/407* (2013.01)

(58) Field of Classification Search
None
See application file for complete search history.

(56) References Cited

U.S. PATENT DOCUMENTS 5,262,623 A 11/1993 Batterman et al.
5,510,992 A 4/1996 Kara
(Continued)

FOREIGN PATENT DOCUMENTS

WO 00/49580 8/2000

OTHER PUBLICATIONS

JP Leon, "Systems and Methods for Facilitating Replacement of Computer-Based Value-Bearing Items," U.S. Appl. No. 12/316,240, filed Dec. 9, 2008, pp. 1-155 (including specification pp. 1-104, claims pp. 105-115, abstract p. 116 and drawings pp. 117-155).
(Continued)

*Primary Examiner* — Paul Danneman
(74) *Attorney, Agent, or Firm* — Khorsandi Patent Law Group, A Law Corporation; Marilyn R. Khorsandi

(57) ABSTRACT

Various exemplary embodiments of the present invention will provide methods and systems for automatic tracking and reporting of refunds for parcels for which the United States Postage Service (the "USPS") fails to provide delivery to the designated delivery address by a guaranteed delivery date. Various embodiments of the present invention will automatically detect a parcel for which a delivery date has been guaranteed, but for which the USPS failed to make delivery by the guaranteed delivery date. For such guaranteed delivery failures, various embodiments of the present invention will display an online report to the user, or will send an electronic report of the failure, such as by electronic mail ("email"), to the user that printed the corresponding USPS Express Mail postage, or will otherwise notify the user of, or make available to the user information regarding, such failures. Various embodiments of the present invention will automatically and periodically analyze electronic and/or digital scanning events provided by the USPS regarding postage printed by users that used the subject Internet postage provider to print Express Mail Postage with a corresponding USPS Express Mail Label Number. Various embodiments of the present invention will automatically and periodically analyze such electronic and/or digital scanning events in order to determine whether a scanned tracking event indicates a delivery corresponding to postage printed by a user using the subject Internet postage provider and in
(Continued)

order, then, to determine whether the actual delivery date and/or time, if delivered, exceeds the guaranteed delivery and/or time.

17 Claims, 18 Drawing Sheets

(56) References Cited

U.S. PATENT DOCUMENTS

| | | | |
|---|---|---|---|
| 5,573,277 | A | 11/1996 | Petkovsek |
| 5,612,889 | A | 3/1997 | Pintsov et al. |
| 5,626,286 | A | 5/1997 | Petkovsek |
| 5,682,318 | A | 10/1997 | Kara |
| 5,717,597 | A | 2/1998 | Kara |
| 5,737,729 | A | 4/1998 | Denman |
| 5,801,944 | A | 9/1998 | Kara |
| 5,809,479 | A | 9/1998 | Martin |
| 5,812,991 | A | 9/1998 | Kara |
| 5,848,401 | A | 12/1998 | Goldberg |
| 5,923,406 | A | 7/1999 | Brasington et al. |
| 6,005,945 | A | 12/1999 | Whitehouse |
| 6,010,156 | A | 1/2000 | Block |
| 6,085,170 | A | 7/2000 | Tsukuda |
| 6,192,165 | B1 | 2/2001 | Irons |
| 6,208,980 | B1 | 3/2001 | Kara |
| 6,244,763 | B1 | 6/2001 | Miller |
| 6,296,404 | B1 | 10/2001 | Pierce et al. |
| 6,415,983 | B1 | 7/2002 | Ulver et al. |
| 6,419,782 | B1 | 7/2002 | Johnson et al. |
| 6,424,954 | B1 | 7/2002 | Leon |
| 6,427,021 | B1 | 7/2002 | Fischer et al. |
| 6,461,063 | B1 | 10/2002 | Miller |
| 6,505,179 | B1 | 1/2003 | Kara |
| 6,505,980 | B1 | 1/2003 | Allday |
| 6,557,755 | B1 | 5/2003 | Pickering et al. |
| 6,592,027 | B2 | 7/2003 | Kovlakas |
| 6,594,374 | B1 | 7/2003 | Beckstrom et al. |
| 6,655,579 | B1 | 12/2003 | Delman et al. |
| 6,687,684 | B1 | 2/2004 | Whitehouse |
| 6,701,304 | B2 | 3/2004 | Leon |
| 6,722,563 | B1 | 4/2004 | Johnson et al. |
| 6,722,565 | B2 | 4/2004 | Takeuchi et al. |
| 6,735,575 | B1 | 5/2004 | Kara |
| 6,820,201 | B1 | 11/2004 | Lincoln et al. |
| 6,834,273 | B1 | 12/2004 | Sansone et al. |
| 6,941,286 | B1 | 9/2005 | Foth |
| 7,069,253 | B2 | 6/2006 | Leon |
| 7,085,725 | B1 | 8/2006 | Leon |
| 7,117,363 | B2 | 10/2006 | Lincoln et al. |
| 7,149,726 | B1 | 12/2006 | Lingle et al. |
| 7,191,158 | B2 | 3/2007 | Ogg et al. |
| 7,194,957 | B1 | 3/2007 | Leon et al. |
| 7,243,842 | B1 | 7/2007 | Leon et al. |
| 7,778,939 | B2 | 8/2010 | Ogg et al. |
| 7,818,269 | B2 | 10/2010 | Ogg et al. |
| 7,831,518 | B2 | 11/2010 | Montgomery et al. |
| 7,831,524 | B2 | 11/2010 | Whitehouse |
| 8,005,762 | B2 | 8/2011 | Ogg et al. |
| 9,082,234 | B1 | 7/2015 | Clem |
| 2001/0042052 | A1 | 11/2001 | Leon |
| 2002/0023057 | A1 | 2/2002 | Goodwin et al. |
| 2002/0046195 | A1 | 4/2002 | Martin et al. |
| 2002/0051205 | A1 | 5/2002 | Teranishi et al. |
| 2002/0073039 | A1 | 6/2002 | Ogg et al. |
| 2002/0083020 | A1 | 6/2002 | Leon |
| 2002/0083021 | A1 | 6/2002 | Ryan, Jr. et al. |
| 2003/0037008 | A1 | 2/2003 | Raju et al. |
| 2003/0046103 | A1 | 3/2003 | Amato et al. |
| 2003/0089765 | A1 | 5/2003 | Kovlakas |
| 2003/0101143 | A1 | 5/2003 | Montgomery et al. |
| 2003/0101147 | A1 | 5/2003 | Montgomery et al. |
| 2003/0101148 | A1 | 5/2003 | Montgomery et al. |
| 2003/0140017 | A1 | 7/2003 | Patton et al. |
| 2003/0149674 | A1 | 8/2003 | Good et al. |
| 2003/0177021 | A1 | 9/2003 | Dutta |
| 2003/0217017 | A1 | 11/2003 | Willoughby et al. |
| 2004/0044586 | A1 | 3/2004 | Gullo et al. |
| 2004/0186811 | A1 | 9/2004 | Gullo et al. |
| 2004/0215478 | A1 | 10/2004 | Baker et al. |
| 2004/0223798 | A1 | 11/2004 | Ogg et al. |
| 2005/0038758 | A1 | 2/2005 | Hilbush et al. |
| 2005/0065892 | A1 | 3/2005 | Ryan et al. |
| 2005/0065897 | A1 | 3/2005 | Ryan et al. |
| 2005/0195214 | A1 | 9/2005 | Reid et al. |
| 2005/0256731 | A1 | 11/2005 | Mougey et al. |
| 2005/0256811 | A1 | 11/2005 | Pagel et al. |
| 2006/0015469 | A1* | 1/2006 | Whitehouse ....... G06Q 10/0831 705/410 |
| 2006/0020505 | A1 | 1/2006 | Whitehouse |
| 2006/0041519 | A1 | 2/2006 | Ogg et al. |
| 2006/0095391 | A1 | 5/2006 | Cordery et al. |
| 2007/0100672 | A1 | 5/2007 | McBride et al. |
| 2008/0007625 | A1 | 1/2008 | Reid et al. |
| 2009/0024544 | A1 | 1/2009 | Elliot et al. |
| 2009/0164662 | A1 | 6/2009 | Mather |
| 2009/0248470 | A1 | 10/2009 | Pintsov et al. |

OTHER PUBLICATIONS

JP Leon, "Mail Piece Processing," U.S. Appl. No. 12/316,542, filed Dec. 11, 2008, pp. 1-72 (including specification pp. 1-49, claims pp. 50-57, abstract p. 58 and drawings pp. 59-72).

John Roland Clem, "Automatic Guarantee Delivery Tracking and Reporting for United States Postal Service Postage Refunds for Paid Computer-Based Postage," U.S. Appl. No. 12/500,970, filed Jul. 10, 2009, pp. 1-67 (including specification pp. 1-39, claims pp. 40-48, abstract p. 49 and drawings pp. 50-67).

John Roland Clem, "Rolls of Image-Customized Value-Bearing Items and Systems and Methods for Providing Rolls of Image-Customized Value-Bearing Items," U.S. Appl. No. 12/943,519, filed Nov. 10, 2010, pp. 1-70 (including preliminary amendment pp. 1-8, specification pp. 9-54, claims pp. 55-59, abstract p. 60 and drawings pp. 61-70).

Ogg, et al., "Automated Handling of Computer-Based Postage System Printing Errors," U.S. Appl. No. 13/175,403, filed Jul. 1, 2011, pp. 1-59 (including specification pp. 1-36, claims pp. 37-39, abstract p. 40, drawings pp. 41-50 and Preliminary Amendment pp. 51-59).

Notice of Allowance for U.S. Appl. No. 09/975,532, dated Sep. 6, 2006, pp. 1-8.

Office Action for U.S. Appl. No. 10/747,936, dated Mar. 9, 2007, pp. 1-10.

Office Action for U.S. Appl. No. 10/747,936, dated Feb. 26, 2008, pp. 1-25.

Office Action for U.S. Appl. No. 10/747,936, dated Sep. 18, 2008, pp. 1-39.

Office Action for U.S. Appl. No. 10/747,936, dated Apr. 13, 2009, pp. 1-52.

Office Action for U.S. Appl. No. 10/747,936, dated Aug. 18, 2009, pp. 1-42.

Notice of Allowance and Interview Summary for U.S. Appl. No. 10/747,936, dated Apr. 5, 2010, pp. 1-24, USPTO.

Notice of Allowance for U.S. Appl. No. 10/731,992, dated Feb. 25, 2010, pp. 1-9, USPTO.

Notice of Allowance for U.S. Appl. No. 10/688,548, dated Sep. 5, 2006, pp. 1-8.

Office Action for U.S. Appl. No. 10/922,334, dated Nov. 9, 2009, pp. 1-28, USPTO.

Office Action for U.S. Appl. No. 10/922,334, dated Oct. 28, 2008, pp. 1-20.

Office Action for U.S. Appl. No. 10/922,334, dated Apr. 23, 2009, pp. 1-30.

Office Action for U.S. Appl. No. 10/922,334, dated Sep. 30, 2010, pp. 1-38, USPTO.

Notice of Allowance for U.S. Appl. No. 10/922,334, dated Mar. 17, 2011, pp. 1-9, USPTO.

Notice of Allowance for U.S. Appl. No. 10/994,768, dated Jan. 5, 2007, pp. 1-8, USPTO.

(56) References Cited

OTHER PUBLICATIONS

Notice of Allowance for U.S. Appl. No. 11/635,871, dated Jul. 15, 2008, pp. 1-8.
Notice of Allowance for U.S. Appl. No. 11/635,871, dated Nov. 17, 2008, pp. 1-12.
Office Action for U.S. Appl. No. 12/316,542, dated Mar. 30, 2011, pp. 1-37.
Office Action for U.S. Appl. No. 12/316,542, dated Sep. 29, 2011, pp. 1-42.
Office Action for U.S. Appl. No. 12/316,542 dated Dec. 16, 2014, pp. 1-58, USPTO.
Office Action for U.S. Appl. No. 12/500,970, dated Jun. 1, 2012, pp. 1-26, USPTO.
Office Action for U.S. Appl. No. 12/500,970 dated Oct. 29, 2014, pp. 1-18, USPTO.
Notice of Allowance for U.S. Appl. No. 12/500,970, dated Mar. 13, 2015, pp. 1-9, USPTO.
Office Action for U.S. Appl. No. 13/175,403 dated Jan. 24, 2012, pp. 1-17, USPTO.
Office Action for U.S. Appl. No. 13/175,403 dated May 29, 2012, pp. 1-20, USPTO.
Office Action for U.S. Appl. No. 13/175,403 dated Mar. 31, 2014, pp. 1-21, USPTO.
"Need more trackits?", 4 pages, http://www.trackmymail.com, 8341 Beechcraft Ave., Gaithersburg, MD 20879, 888-444-9972 or 310-924-2373, not dated.
"Direct Mail Tracking Online, Real-Time At Your Fingertips", 18 pages, http://www.trackmymail.com/, printed Dec. 3, 2003.
Endicia Internet Postage, 3 pages, http://www.endicia.com/, printed Dec. 29, 2003.
Watson, Neva, "Changes to the Domestic Mail Manuel to Implement Confirm ®—Service," 67 FR 53454, Aug. 15, 2002, 12 pages.
Marll Thiede, "Parcel Trends Revealed, Part 2: Results of the Annual Parcel Best Practices Survey," dated Nov. 10, 2006, 6 pages, www.rbpub.com.
"Stamps.com to Pilot a New PC Postage Product," ePostal News, Aug. 2, 2004, Copyright 2004, G2 Computer Intelligence, Inc., 3 pages.

* cited by examiner

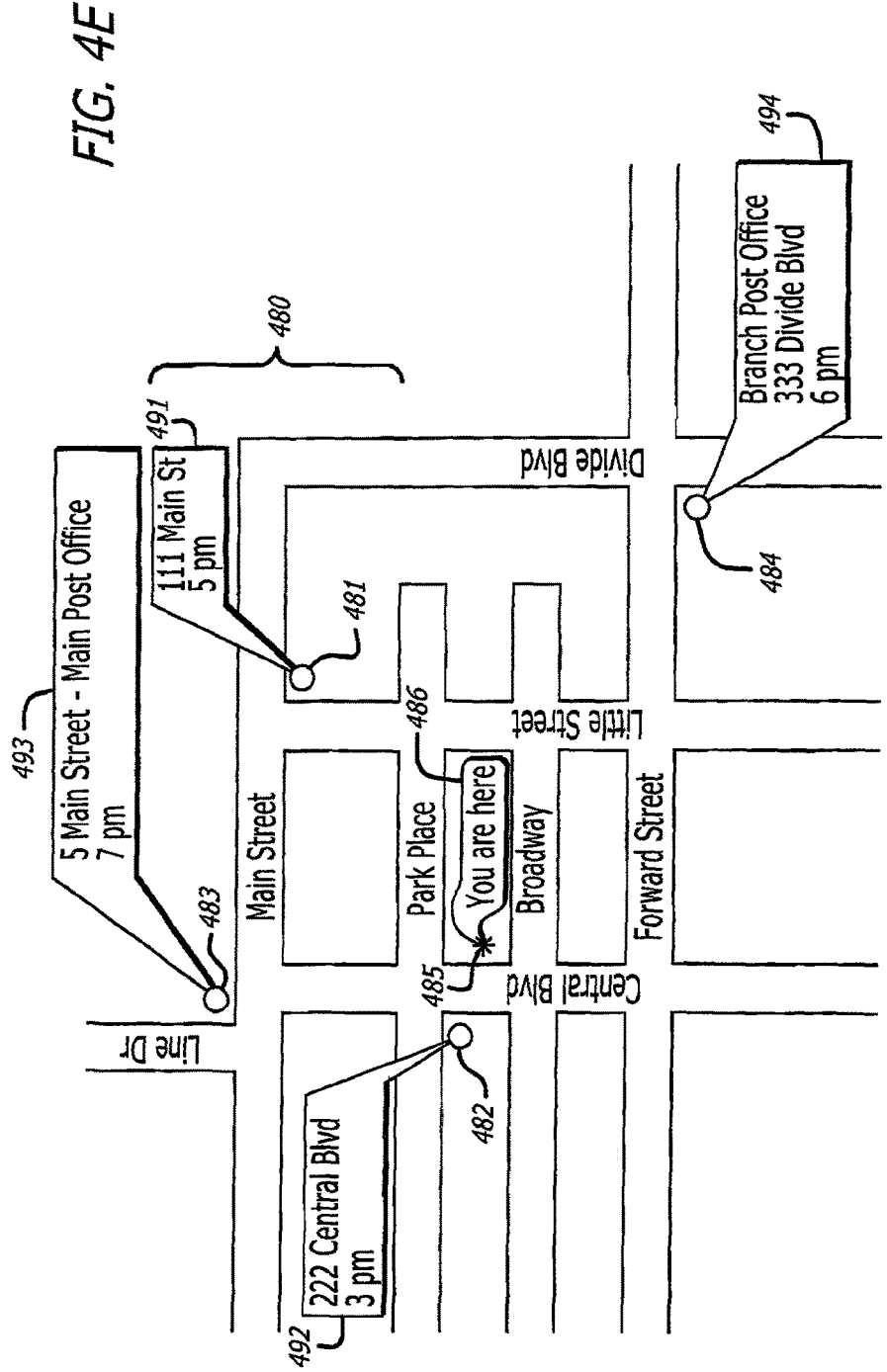

We have Checked USPS Scan data and discovered that your package bearing Express Mail Label No. XX 999999999 US was, as of XX/DD/YY:

☐ Not Delivered

☐ Delivered After the calculated Guaranteed Delivery Date: MM/DD/YY

Based on the above-described information, you may be able to obtain a refund from the USPS because it appears that the USPS failed to meet their delivery guarantee. To obtain a refund print this page by clicking the Print Button Below, and present the printed report to your Post Office Paid Postage Receipt
USPS Express mail Label No.
XX 999999999 US
Amount of Postage Paid to
Postage Provider: $99.99
Date Paid: MM/DD/YY  — 950

910

Print — 970

FIG. 9

We have Checked USPS Scan data and discovered that your package bearing Express Mail Label No. XX 9999999999 US was, as of XX/DD/YY:

☐ Not Delivered

☐ Delivered After the Calculated Guaranteed Delivery Date:
MM/DD/YY

Based on the above-described information, you may be able to obtain a refund from the USPS, because it appears that the USPS failed to meet their delivery guarantee. If you would prefer to make your own application for a refund, click the Print Button below and present the printed report to your Post Office. If, on the other hand, you would prefer that we, or someone or our behalf, proceeds to request a refund electronically, please click the Authorization Button below.

Paid Postage Receipt
USPS Express Mail Label No. XX 9999999999 US
Amount of Postage Paid to Postage Provider: $99.99
Date Paid: MM/DD/YY — 1196
— 1195
— 1120 I Authorize an electronic Refund Request for this item
— 1190 Print

FIG. 11

Example Express Mail Service Commitments API request:

```
<soapenv:Envelope xmlns:soapenv="http://schemas.xmlsoap.org/soap/envelope/"
xmlns:exp="http://stamps.com/xml/namespace/2008/3/ExpressMail/ExpressMailSer
viceCommitmentsV1">
  <soapenv:Header/>
  <soapenv:Body>
    <exp:GetCommitments>
      <!--Optional:-->
      <exp:origin_zip>90066</exp:origin_zip>
      <!--Optional:-->
      <exp:destination_zip>92630</exp:destination_zip>
      <exp:shipping_date>2009-06-19T00:00:00Z</exp:shipping_date>
    </exp:GetCommitments>
  </soapenv:Body>
</soapenv:Envelope>
```

FIG. 12

```
Example Express Mail Service Commitments API response:
<soap:Envelope xmlns:soap="http://schemas.xmlsoap.org/soap/envelope/"
 xmlns:xsi="http://www.w3.org/2001/XMLSchema-instance"
 xmlns:xsd="http://www.w3.org/2001/XMLSchema">
  <soap:Body>
    <GetCommitmentsResponse
 xmlns="http://stamps.com/xml/namespace/2008/3/ExpressMail/ExpressMailServiceCommitmentsV1">
      <GetCommitmentsResult>
        <origin_zip>90066</origin_zip>
        <origin_city>LOS ANGELES</origin_city>
        <origin_state>CA</origin_state>
        <destination_zip>92630</destination_zip>
        <destination_city>LAKE FOREST</destination_city>
        <destination_state>CA</destination_state>
        <shipping_date_time>2009-06-19T14:44:00</shipping_date_time>
        <commitments>
          <commitment>
            <name>Next Day</name>
            <time>3:00 PM</time>
            <sequence>A0115</sequence>
            <sdc_sequence>next_day_by_3pm</sdc_sequence>
            <locations>
              <location>
                <cutoff>2009-06-19T17:50:00</cutoff>
                <facility>POST OFFICE</facility>
                <street>3826 GRAND VIEW BLVD</street>
                <city>LOS ANGELES</city>
                <state>CA</state>
                <zip>90066</zip>
              </location>
              <location>
                <cutoff>2009-06-19T15:30:00</cutoff>
                <facility>EXPRESS MAIL COLLECTION BOX</facility>
                <street>3826 Grand View Ave</street>
                <city>LOS ANGELES</city>
                <state>CA</state>
                <zip>90066</zip>
              </location>
            </locations>
          </commitment>
        </commitments>
      </GetCommitmentsResult>
    </GetCommitmentsResponse>
  </soap:Body>
</soap:Envelope>
```

FIG. 13

AUTOMATIC GUARANTEE DELIVERY TRACKING AND REPORTING FOR UNITED STATES POSTAL SERVICE POSTAGE REFUNDS FOR PAID COMPUTER-BASED POSTAGE

CROSS REFERENCE TO RELATED APPLICATIONS

This is a continuation application of, and this application claims priority to, U.S. application Ser. No. 12/500,970, which was filed on Jul. 10, 2009, titled "Automatic Guarantee Delivery Tracking and Reporting for United States Postal Service Postage Refunds for Paid Computer-Based Postage," the entire disclosures and contents of which are incorporated herein in full by reference as if stated in full herein.

FIELD OF THE INVENTION

The field of the present invention is computer-based postage and more specifically, automatic guarantee delivery tracking and reporting for United States Postal Service postage refunds for paid computer-based postage.

BACKGROUND OF THE INVENTION

As will be understood by someone with ordinary skill in the art, the USPS guarantees delivery for USPS Express Mail, and for USPS Global Express Mail, also sometimes referred to as USPS Express Mail International.

There are some reasons why automated USPS Postage Refunds are different from the way private carriers handle failures to deliver a parcel by a guaranteed delivery time and date. In particular, it will be understood by someone with ordinary skill in the art that currently, the United States Postal Service ("USPS") postage represents a paid amount of postage. That is, currently, the USPS requires upfront payment for postage before accepting a parcel for mailing.

As compared to the USPS, a private carrier such as UPS®, bills a shipping user's account for its shipping services after the private carrier processes the package, to which a shipping label has already been attached, through its processing facilities. That is, a shipping user may print a UPS® shipping label and affix it to a package. When a UPS®-shipping user wants to print a UPS® label, the UPS®-shipping user will provide package weight and dimension information. UPS® will subsequently process the package, with a UPS® shipping label already attached, through its package processing facilities. Adjustments for any differences between the weight and/or dimensions provided by the UPS® shipping user and the actual measurements of the package will be made in a final amount charged to the account of the UPS® shipping user for shipping the package using UPS® shipping services.

Similar to UPS®, other private carriers, such as FEDEX® bill a shipping user's account for its shipping services after processing the package, to which a shipping label has already been attached, through the private carrier's processing facilities. That is, a shipping user may print a FEDEX® shipping label and affix it to a package. When a FEDEX®-shipping user wants to print a FEDEX® label, the FEDEX®-shipping user will provide package weight and dimension information. FEDEX® will subsequently process the package, with a shipping label already attached, through its package processing facilities. Adjustments for any differences between the weight and/or dimensions provided by the FEDEX® shipping user and the actual measurements of the package to be shipped will be made in a final amount charged to the account of the FEDEX® shipping user for shipping the package using FEDEX® shipping services.

Some private carriers will accept electronic challenges to the private carrier's guarantee for delivering particular parcels. That is, some private carriers will accept an electronic notification of an instance of a mailer's/customer's parcel not having been delivered by the private carrier parcel by the private carrier's guaranteed delivery date. When a private carrier agrees with a user's/mailer's delivery guarantee challenge, the private carrier will adjust the final amount billed to the account of the private carrier's user/mailing.

As compared to the above-described process that a private carrier may use for adjusting a final amount charged to a user's/mailer's account to reflect a failure by the private carrier to deliver a parcel by the carrier's delivery guarantee date, a mailer that uses the USPS, must currently complete a paper application, and provide evidence of payment of USPS postage, such as a receipt.

Currently, one way for a user/mailer to manage USPS mailing charges with respect to USPS delivery guarantees, is to periodically access the USPS website, enter the USPS Express Mail Label Number associated with a parcel, and request tracking information for the parcel. If the guarantee date for delivery for a parcel has passed, and there has been no delivery, or if the user is presented with a report of delivery after the guaranteed delivery date, the user could then print the report, go to the USPS Post Office and complete an application for a refund, attaching the receipt for payment of the Express Mail postage.

Another currently existing way that a user/mailer could manage USPS mailing charges with respect to USPS delivery guarantees, is to periodically access an Internet postage provider's website, enter the USPS Express Mail Label Number associated with a parcel that the user/mailer had used the Internet provider's website for purchasing the postage, and request tracking information for the parcel. If the guarantee date for delivery for a parcel has passed, and there has been no delivery, or if the user is presented with a report of delivery after the guaranteed delivery date, the user could then print the report, go to the USPS Post Office and complete an application for a refund, attaching the receipt for payment through the Internet postage provider's website of the Express Mail postage.

Alternatively, some Internet providers may facilitate a user accessing a history of postage printed by the user using the Internet providers website. When the user accesses the user's print history, if the user had used the Internet postage provider website to purchase Express Mail postage with an Express Mail label number, the Internet postage provider would, for example, display a hypertext link for the Express Mail postage that, if clicked by the user, would report tracking information for the parcel, or alternatively, would navigate the user's access to the USPS website, which could then provide the user with tracking information.

One of the problems with the above-described process for a user to identify parcels for which the USPS has failed to deliver the parcel by the delivery guarantee date is that the user must access a website and either enter a USPS Express Mail Label Number or find a print history entry for the USPS Express Mail Label Number and check to see if the tracking information will report that the parcel has been delivered or not.

While the above-described process would not present an overwhelming problem if there is only a single parcel involved, the above-described process may become unmanageable for a larger number of parcels. That is, for an enterprise that mails a plurality of USPS Express Mail parcels within a relatively short time, the process of periodically checking the actual delivery date against the guaranteed delivery date may require more time than anyone in the enterprise is willing to spend. Consequently, delivery guarantee failures may go undetected by the user/mailer.

Accordingly, some way is needed for automatically reporting USPS delivery guarantee failures so that the user/mailer can request a refund.

Further, a way is needed for automatically reporting USPS delivery guarantee failures to the USPS when the USPS agrees to receive such automatic reports, and for receiving refunds on behalf of the respective user for which the refund is being requested.

SUMMARY OF THE INVENTION

Various exemplary embodiments of the present invention will provide methods and systems for automatic tracking and reporting of refunds for parcels for which the United States Postage Service (the "USPS") fails to provide delivery to the designated delivery address by a guaranteed delivery date.

Various embodiments of the present invention will automatically detect a parcel for which a delivery date has been guaranteed, but for which the USPS failed to make delivery by the guaranteed delivery date. For such guaranteed delivery failures, various embodiments of the present invention will display an online report to the user, or will send an electronic report of the failure, such as by electronic mail ("email"), to the user that printed the corresponding USPS Express Mail postage, or will otherwise notify the user, or make access available to the user of status information, of such failures.

Various embodiments of the present invention will automatically and periodically analyze electronic and/or digital scanning events provided by the USPS regarding postage printed by users that used the subject Internet postage provider to print Express Mail Postage with a corresponding USPS Express Mail Label Number. Various embodiments of the present invention will automatically and periodically analyze such electronic and/or digital scanning events in order to determine whether a scanned tracking event indicates a delivery corresponding to postage printed by a user using the subject Internet postage provider and in order, then, to determine whether the actual delivery date and/or time, if delivered, exceeds the guaranteed delivery and/or time.

BRIEF DESCRIPTION OF THE DRAWINGS

These and other features of the present invention are more fully set forth in the following description of exemplary embodiments of the invention. The description is presented with reference to the accompanying drawings in which:

FIG. 4E depicts an exemplary map display in an exemplary embodiment of the present invention;

FIG. 9 is a graphic depiction of an exemplary graphic user interface for reporting a failed guarantee delivery and a corresponding refund opportunity in an exemplary embodiment of the present invention;

FIG. 11 is a graphic depiction of an exemplary graphic user interface for reporting a failed guarantee delivery and requesting an authorization from the user to proceed with an automatic request to the USPS for a corresponding refund in an exemplary embodiment of the present invention;

FIG. 12 depicts an exemplary Express Mail Service Commitments API request in an exemplary embodiment of the present invention; and FIG. 13 depicts an exemplary Express Mail Service Commitments API response in an exemplary embodiment of the present invention.

DETAILED DESCRIPTION OF THE INVENTION

Various exemplary embodiments of the present invention are described herein with respect to a computer system operated by an exemplary Internet postage provider. In the various exemplary embodiments described herein, the exemplary Internet postage provider is an entity other than a postal service.

However, it will be understood by someone with ordinary skill in the art that other embodiments, including an embodiment that operates using a postal service computer system, or an Applications Program Interface ("API"), or other alternatives, would be possible without departing from the spirit of the present invention.

Figure 1:
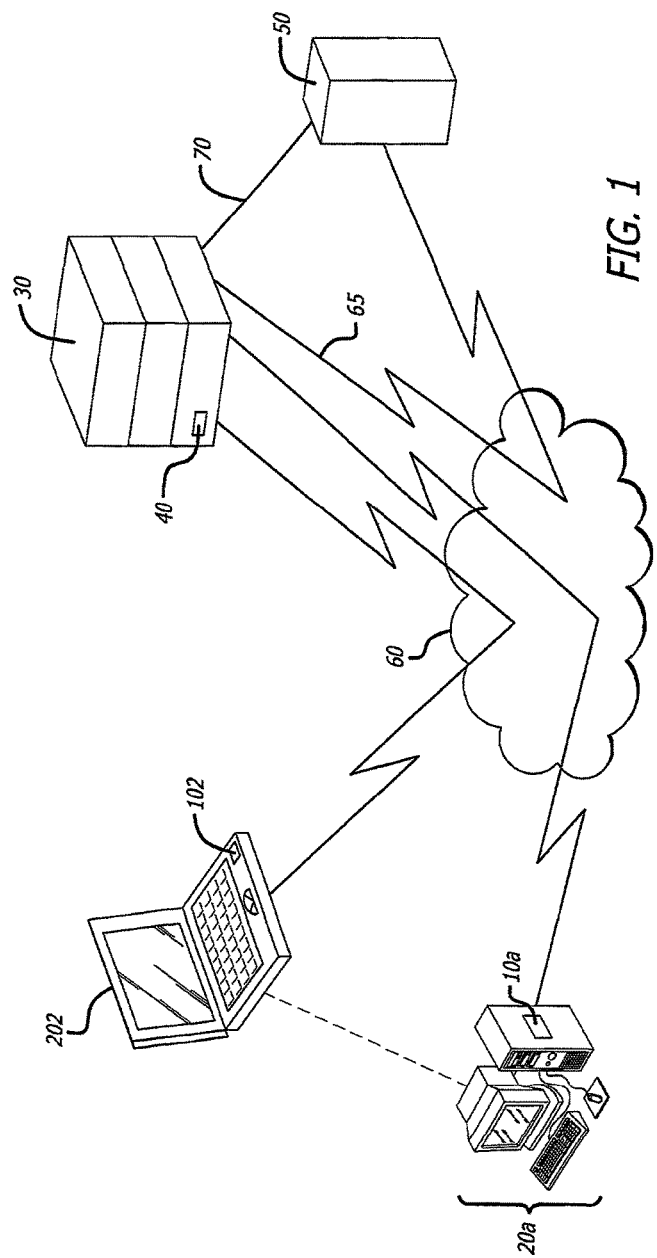
FIG. 1 is a graphic depiction of exemplary entity relationships between a plurality of user computers, an exemplary Internet computer-based postage provider computer system, and a United States Postal Service computer system, in an exemplary embodiment of the present invention.

The exemplary embodiment will comprise an exemplary on-line Internet-enabled postage provider computer system, such as, for example, as illustratively disclosed in U.S. patent application Ser. No. 09/163,993 filed on Sep. 29, 1998, entitled "On Line Postage System", the entire contents and disclosures of which are hereby incorporated by reference herein for all purposes as if fully set forth herein. As therein disclosed, and as illustratively depicted in high level in FIG. 1, an exemplary on-line Internet postage provider computer system may comprise a plurality of user/client computer systems, e.g., 20a-20z, connected, or connectable, for communication with an on-line Internet-enabled postage provider server computer system, e.g., 30, which is in turn connected to a USPS system, e.g., 50, such as, for example, over a connection 65 through the Internet 60, through a direct access 70, or through some other connection adapted for computer access, whether now known or in the future discovered. The exemplary server system 30 is preferably capable of communicating with one or more user/client computer systems, e.g., 20a-20z, simultaneously, or substantially simultaneously.

Exemplary software for one exemplary Internet postage provider computer system comprises respective user code 10a-10z, sometimes referred to as client software, that resides on, and is executable by, each respective user/client computer system, e.g., 20a-20z, that accesses the on-line Internet-enabled postage provider server computer system, e.g., 30; exemplary controller code, also sometimes referred to as server software, 40, resides on, and is executable by, the on-line Internet-enabled postage provider server computer system 30.

In such an embodiment, using a respective user/client computer system, e.g., 20a-20z, each respective user would, for example, access a website 70 to register to use the exemplary Internet postage provider computer system; from the website 70, for example, the user would request a download of downloadable client software 10, such as, for example, from the on-line Internet-enabled postage provider server computer system 30. Once the user had downloaded the downloadable client software to the user's respective user/client computer system 20a-20z, the user would install the client software to operate as the user's respective client software 10a-10z on the user's respective user/client computer system 20a-20z.

It will be understood by someone with ordinary skill in the art that the above-described embodiment comprising client software, e.g., 10a-10z, and server software 40 is illustrative and non-limiting. For example, in other exemplary embodiments, the exemplary server system 30 would be enabled to perform all of the functions that would be performed by the combination of the client software 10a-10z and the server software 40 in the above-described client software/server software embodiment. As a further alternative exemplary embodiment, user/client software 10a-10z, or software that is installed to be operable on a user's own respective computer device, e.g., 20a-20z, could be enabled to perform all of the functions that would be performed by the combination of the client software 10a-10z and the server software 40 in the above-described client software/server software embodiment.

Thus, it will be understood by someone with ordinary skill in the art that description hereinbelow of exemplary program code operable to provide various exemplary features of the present invention will include exemplary program code that may be operable on a user/client computer device, and/or on a server computer device, as the case may be, without limitation of the present invention.

It will be understood by someone with ordinary skill in the art that description hereinbelow of various drawing elements with suffixes such as "a" through "z" are exemplary and are not a limitation of the invention to any particular number. Rather, the suffixes "a" through "z", and similar notations, are used to represent an unknown plurality of similar elements.

The exemplary embodiment of the present invention described herein illustrates various exemplary features of an exemplary embodiment of the present invention with respect to respective user/client computers, e.g., 10a-10z, that may comprise a computer device, such as a personal computer, laptop, PDA, handheld devices, and the like. It will be understood by someone with ordinary skill in the art, however, that the present invention is not limited to user-computer embodiments. Rather, various other embodiments of the present invention could be implemented in a variety of other contexts, including but not limited to ATMs, kiosks, postal retail centers, postage meters, and the like without departing from the spirit of the present invention.

The exemplary embodiment of the present invention described herein illustrates connection for communication over the Internet. It will be understood by someone with ordinary skill in the art that the description of Internet connection and communication is not a limitation of the present invention. Rather, other means for communication and access, whether now known or in the future discovered, could be used without departing from the spirit of the invention.

The exemplary embodiment of the present invention is described hereinbelow with respect to bar codes. It will be understood by someone with ordinary skill in the art that a bar code is a machine-readable data symbology. It will be understood by someone with ordinary skill in the art that references herein to bar codes are non-limiting, illustrative references to machine-readable data symbologies of types now known and in the future discovered, including but not limited two-dimensional ("2-D") barcodes and matrix codes. It will be understood by someone with ordinary skill in the art that other types of machine-readable data symbologies, including RFID technologies, could be used without departing from the spirit of the present invention.

Figure 2:
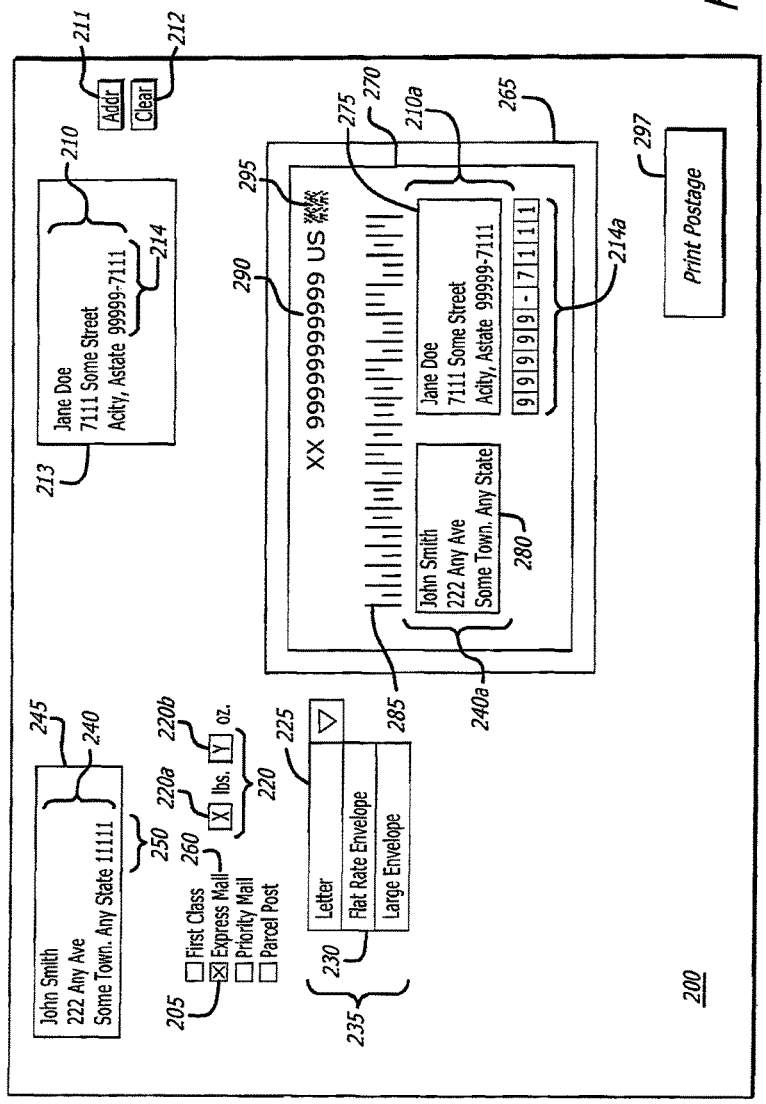
FIG. 2 is a graphic depiction of an exemplary graphic user interface for requesting an exemplary USPS Express Mail Label with a corresponding exemplary USPS Express Mail Label Number in an exemplary embodiment of the present invention.

The exemplary Internet postage provider computer system will comprise program code operable for fulfilling a request by a user for USPS Express Mail postage and a corresponding USPS Express Mail Label with a USPS Express Mail Label Number, as depicted for illustrative purposes in an exemplary graphic user interface 200 shown in FIG. 2. In the exemplary embodiment, the USPS would assign the exemplary Internet postage provider, a block of Express Mail numbers, for example, 100,000 Express Mail numbers or identifiers. The exemplary Internet postage provider computer system associated with the exemplary Internet postage provider will comprise program code operable to store each block of USPS Express Mail numbers or identifiers in a computer-accessible memory, or otherwise make the block of USPS Express Mail numbers accessible to the exemplary Internet postage provider computer system.

When a user of the exemplary Internet postage provider computer system inputs a request for USPS Express Mail postage indicia, the exemplary Internet postage provider computer system would comprise program code operable to receive the user's input of a request for USPS Express Mail postage indicia and in response to that request, access the USPS Express Mail numbers or identifiers in the computer-accessible memory, or otherwise access available USPS Express Mail numbers or identifiers, to obtain or identify an available USPS Express Mail number or identifier.

Once the exemplary Internet postage provider computer system has identified an available USPS Express Mail number or identifier, the exemplary Internet postage provider computer system would comprise program code operable to provide the available USPS Express Mail number or identifier, or otherwise make the available USPS Express Mail number or identifier accessible to software, such as, for example, client software, for inclusion in an exemplary USPS Express Mail mailing label. Once a USPS Express Mail number or identifier has been made available for inclusion in a mailing label, in the exemplary embodiment, it would be reportable to the USPS as a USPS Express Mail number or identifier that is no longer available.

The exemplary embodiment would be SCAN-Form compatible. As will be understood by someone with ordinary skill in the art, the USPS has not been scanning, or at least has not always consistently scanned, receipt of a postal item bearing computer-based, or Internet-based, postage indicia. To allow tracking of postal items mailing in a trackable mail class (e.g., USPS Express Mail), or otherwise bearing a trackable indicia (including a Delivery Confirmation, or Signature Confirmation, tracking identifier), as will be understood by someone with ordinary skill in the art, the USPS has introduced SCAN forms. USPS SCAN forms allow a user of computer-based, or Internet-based, postage indicia, to provide for scanning by the USPS of entry into the mail stream of a postal item bearing computer-based, or Internet-based, USPS postage indicia.

A user may include, such as on a daily basis, each trackable indicia, such as each USPS Express Mail number or identifier, and/or each Delivery Confirmation or Signature Confirmation number or identifier, in a USPS SCAN form. The user prints the SCAN form and the USPS will scan the form—by scanning the form, each trackable number or identifier included in the SCAN form will be identified by the USPS as having been received into the postal system.

In the exemplary SCAN-form compatible embodiment, if the user includes the USPS Express Mail number or identifier for printing in a SCAN form, the exemplary Internet postage provider computer system would comprise program code operable to report the use of the USPS Express Mail number or identifier in a next batch sent to the USPS. In the exemplary embodiment, the USPS reporting process would run hourly. Accordingly, in the exemplary embodiment, use of a USPS Express Mail number or identifier that will be included in a SCAN form would be reported to the USPS within an hour of the SCAN form being printed by the user.

In the exemplary embodiment, if the user does not include the USPS Express Mail number or identifier in a printing on a SCAN form, it will be reported in the next batch sent to the USPS on the mailing date after 6 pm standard time in the time zone of the user. The delay would give the user the entire working day to include the USPS Express Mail number or identifier on a SCAN form if they want. The exemplary Internet postage provider computer system would comprise program code operable to compute the time zone of the user based on the LPO ZIP code associated with the user's account. Also, if an area associated with a user observes daylight savings time, the time cut-off for drop off would be 5 pm in the local time zone of the user when daylight savings time is in effect. For a customer base that is predominantly in the continental United States and doesn't use SCAN forms, reporting to the USPS would be grouped into 4 large groups per day, one for each of the primary continental United States time zones.

As depicted in FIG. 2, in the exemplary graphic user interface 200 would provide for input by a user requesting exemplary USPS Express Mail postage and a corresponding exemplary USPS Express Mail Label, an exemplary mail class indicator 205 for indicating a mail class such as, e.g., Express Mail 260.

The exemplary graphic user interface 200 would provide an exemplary Destination Address input window 213 for receiving a user's input of a Destination Address 210, including a Destination postal code, or zip code, 214. As an alternative to keying in a Destination Address and destination zip code 214, the exemplary graphic user interface 200 would further provide an exemplary address button 211 to allow the user to select a destination address and zip code, e.g., exemplary destination address 210 and exemplary destination zip code 214, from an address book (not shown). The exemplary graphic user interface 200 would further provide an exemplary Clear button 212 to allow the user to clear the destination address window 213.

The exemplary graphic user interface 200 would further provide input fields 220a and 220b for inputting pounds and ounces respectively of a weight, e.g., exemplary weight 220.

The exemplary graphic user interface 200 would further provide an exemplary indicator field 225 for indicating, such as from an exemplary pull down menu 235, an envelope or container type, such as, e.g., an indication 230 that the item will be mailed in, e.g., a Flat Rate container, such as a Flat Rate Envelope.

The exemplary embodiment would provide an exemplary Return Address input window 245 to allow the user to input the user's Return Address, such as exemplary Return Address 240. Alternatively, the exemplary embodiment would have on record from the user's prior registration with the postage provider system, an exemplary Return address 240 and/or a zip code 250. The exemplary embodiment would display the user's Return address 240 in the exemplary Return address window 245 and would use the user's Return address 240 and zip code 250 for calculating express mail postage.

The exemplary graphic user interface 200 would further provide an exemplary label window 265 for displaying an exemplary label mockup, e.g., an exemplary mockup 270 of an exemplary USPS Express Mail Label with exemplary postage indicia 295. The exemplary USPS Express Mail Label mockup 270 would show an exemplary Destination Address window 275 for an exemplary mockup Destination Address display 210a and an exemplary mockup Destination zip code display 214a, using the exemplary Destination Address 210 and zip code 214 that the user had input or selected from an Address Book, as the case may be.

The exemplary USPS Express Mail Label mockup 270 would show an exemplary Return Address window 280 for an exemplary mockup Return Address display 240a from the Return Address 240 that the user had input, or that the system had retrieved from the user's prior registration information, as the case may be. The exemplary USPS Express Mail Label mockup 270 would show an exemplary USPS Express Mail graphic symbology, e.g., exemplary USPS Express Mail barcode 285. The exemplary USPS Express Mail Label mockup 270 would show an exemplary USPS Express Mail Label Number, e.g., exemplary USPS Express Mail Label Number 290. In one embodiment, the exemplary USPS Express Mail Label mockup 270 would show an exemplary "dummy" or mockup of a USPS Express Mail Label Number 290. In an alternative embodiment, the exemplary system would generate an exemplary USPS Express Mail Label Number and would display the generated exemplary USPS Express Mail Label Number in the exemplary USPS Express Mail Label Number mockup field 290.

The exemplary graphic user interface 200 would further provide an exemplary Print Postage button 297. When a requesting user is satisfied with the user's input and the mockup of the displayed output label mockup, e.g., exemplary USPS Express Mail Label mockup 270, the user would click the exemplary Print Postage button 297, which would cause the exemplary embodiment to generate, and/or print a previously generated, an exemplary USPS Express Mail Label 298 as depicted in FIG. 3.

Figure 3:
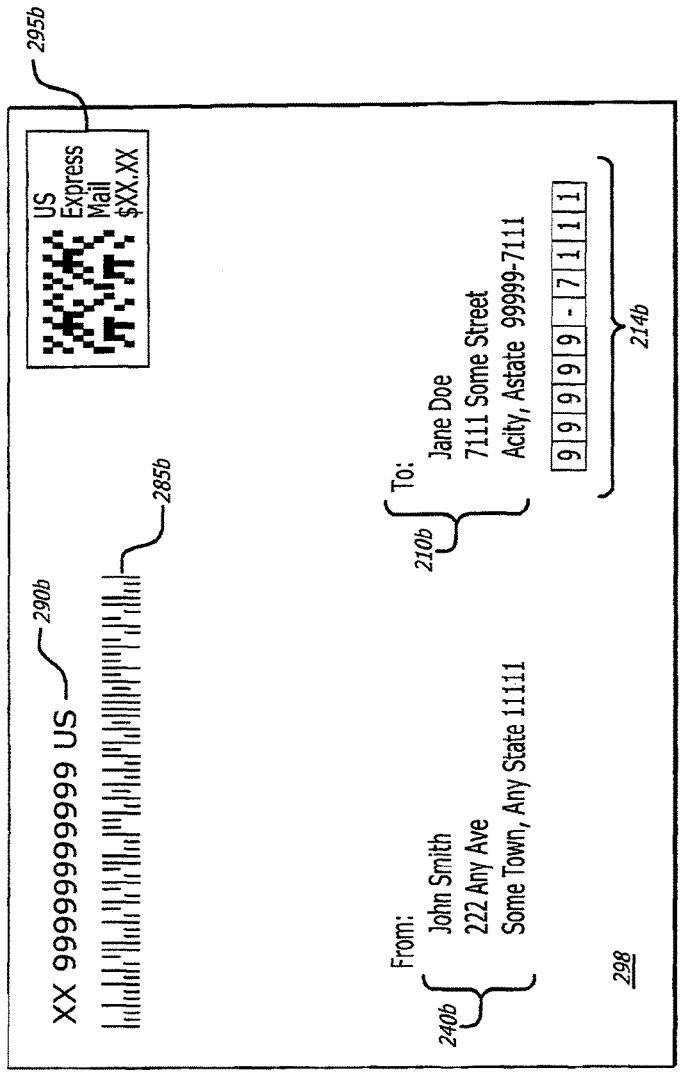
FIG. 3 is a graphic depiction of an exemplary USPS Express Mail Label generated by an exemplary Internet computer-based postage provider computer system in an exemplary embodiment of the present invention.

As depicted in FIG. 3, an exemplary USPS Express Mail Label 298 generated by the exemplary embodiment of the present invention would provide a Destination Address 210*b* that would use the user-input/user-selected Destination Address 210 received by the exemplary graphic user interface 200 as was discussed with respect to FIG. 2. As depicted in FIG. 3, the exemplary USPS Express Mail Label 298 generated by the exemplary embodiment of the present invention would provide a Return Address 240*b* that would use the user-input/system-selected Return Address 240 received by the exemplary graphic user interface 200 as was discussed with respect to FIG. 2. As further depicted in FIG. 3, the exemplary USPS Express Mail Label 298 generated by the exemplary embodiment of the present invention would further provide a Destination Address 210*b* and zip code 214*b* that would use the user-input/user-selected Destination Address 210 and zip code 214 that had been received by the exemplary graphic user interface 200 as was discussed with respect to FIG. 2.

As further depicted in FIG. 3, the exemplary USPS Express Mail Label 298 generated by the exemplary embodiment of the present invention would further provide a USPS Express Mail barcode 285*b* that would be generated and formatted by the exemplary embodiment. As further depicted in FIG. 3, the exemplary USPS Express Mail Label 298 generated by the exemplary embodiment of the present invention would further provide a USPS Express Mail Label Number 290*b* that would be generated and formatted by the exemplary embodiment.

In one embodiment, the USPS Express Mail Label Number would be a unique number that would uniquely identify the particular USPS Express Mail Label and parcel to which it would be affixed; once generated, the unique USPS Express Mail Label Number would be "retired" and would not be available for use.

In an alternative embodiment, the USPS Express Mail Label Number would be a unique number that would comprise an identifier that would be substantially unique, such as during a particular period of time. In such an alternative embodiment, the substantially unique USPS Express Mail Label Number would identify the particular USPS Express Mail Label and parcel to which it would be affixed during a particular period of time; after the USPS Express Mail Label Number is generated and then, for example, later detected as having been delivered, the USPS Express Mail Label Number could be "recycled." For example, the USPS Express Mail Label Number, once scanned as delivered, could be flagged in a database for later "recycled" use.

The exemplary embodiment would be programmed with software operable to generate the USPS Express Mail barcode 285*b* depicted illustratively in FIG. 3 to include, or otherwise reflect, the USPS Express Mail Label Number that the exemplary embodiment had generated.

Figure 4A:
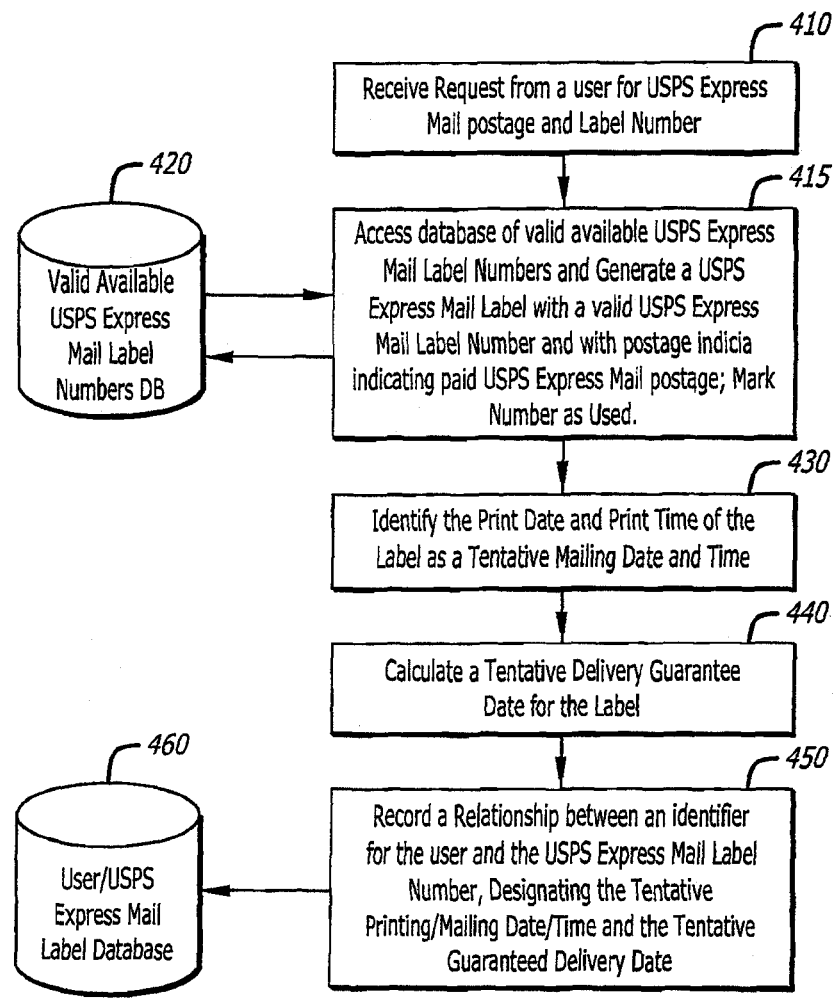
FIG. 4A is a flow diagram depicting exemplary high level logic functions for generating a USPS Express Mail Label and corresponding USPS Express Mail Label Number in an exemplary embodiment of the present invention.

FIG. 4A is a flow diagram depicting exemplary high level logic functions for processing an exemplary user request for USPS Express Mail postage and a USPS Express Mail Label and corresponding USPS Express Mail Label Number in an exemplary embodiment of the present invention. As depicted in FIG. 4A, the exemplary Internet postage provider computer system will comprise program code, as depicted in exemplary process 410, operable for receiving an exemplary request by an exemplary user for USPS Express Mail postage and a corresponding USPS Express Mail Label Number. The exemplary Internet postage provider computer system will further comprise program code, as depicted in exemplary process 415, operable for accessing a database, such as exemplary database 420, of valid, available USPS Express Mail Label Numbers, and further operable for generating a USPS Express Mail Label with a valid USPS Express Mail Label Number and postage indicia indicating paid USPS Express Mail postage; mark the USPS Express Mail Label Number as used in the Valid Available USPS Express Mail Label Numbers database 420.

As depicted in exemplary process 430, the exemplary Internet postage provider computer system would further comprise program code operable for identifying a print date and time of the USPS Express Mail Label. As explained further below, the print date and time will be used by the exemplary embodiment as a tentative mailing date and time, for calculating a tentative delivery guarantee date.

As depicted in exemplary process 440, the exemplary Internet postage provider computer system would further comprise program code operable for calculating a tentative delivery guarantee date. As will be understood by someone with ordinary skill in the art, there are various ways a system could calculate a delivery guarantee date. It will be understood by someone with ordinary skill in the art that an actual guarantee delivery date by the United States Postal Service will be dependent on certain factors. In particular, a USPS Express Mail guarantee delivery date will depend on when (data and time) a USPS Express Mail item is actually received by a particular Post Office and the relationship of the actual receipt date and time as compared to a pickup cutoff data and time for the particular Post Office or drop-off location. As will be understood by someone with ordinary skill in the art, each Post Office branch, and other official mail drop-off locations, will have a respective drop off/pickup cutoff date and time by which a USPS Express Mail item can be guaranteed next day delivery; USPS Express Mail items provided to the particular Post Office after the cutoff time, would be guaranteed for delivery in two (2) business days. Cutoff times are published for each particular Post Office, or branch. However, at the time the USPS Express Mail Label is printed, the exemplary Internet postage provider computer system would not know the Post Office to which the item will actually be provided, or the actual drop-off date and time.

Because of the above-described dependencies, and because such dependencies involve events that would transpire after the relevant postage and label are printed, the exemplary calculation by the exemplary Internet postage provider computer system of a guarantee delivery date as depicted in exemplary process 440 will comprise a calculation of a tentative guarantee delivery date based on facts known to the exemplary Internet postage provider computer system, at the time the subject USPS Express Mail Label Number is being printed. As will be explained further below, the exemplary Internet postage provider computer system will comprise program code operable for later refining the calculation of a guarantee delivery date based on subsequent facts that may be obtained from scan event data received after the subject USPS Express Mail Label is printed.

Before calculating the exemplary tentative guarantee delivery date, as depicted in exemplary process 430, the exemplary Internet postage provider computer system would comprise program code operable for identifying the printing date and time of the Express Mail Label and postage indicia and for determining a tentative mailing date and time based on the printing date and time. In particular, the exemplary Internet postage provider computer system would tentatively use the printing date and time as a tentative mailing date and time.

Figure 4B:
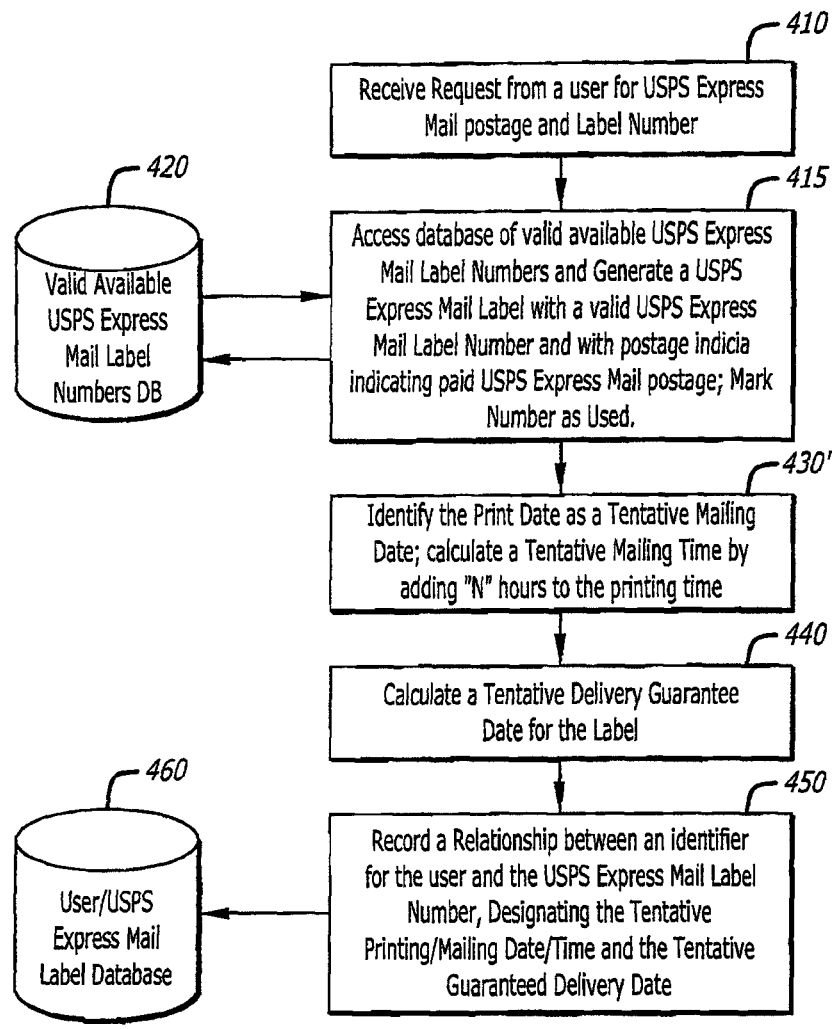
FIGS. 4B, 4C and 4D are flow diagrams depicting exemplary high level logic functions for generating a USPS Express Mail Label and corresponding USPS Express Mail Label Number in alternative exemplary embodiments of the present invention.

It will be understood by someone with ordinary skill in the art that the above-described exemplary use of the printing date and time as a tentative mailing date and time is illustrative and exemplary. In other embodiments, the mailing date and time could be used as a base to calculate a mailing date and time, such as by adding some amount of time, for example, one hour, to the printing time. For example, as depicted in FIG. 4B, in alternative exemplary process 430', an alternative exemplary Internet postage provider computer system would comprise program code operable for identifying the printing date as a tentative mailing date and for calculating a tentative mailing time by adding some amount of time, for example, "N" hours, to the printing time and time.

Figure 4C:
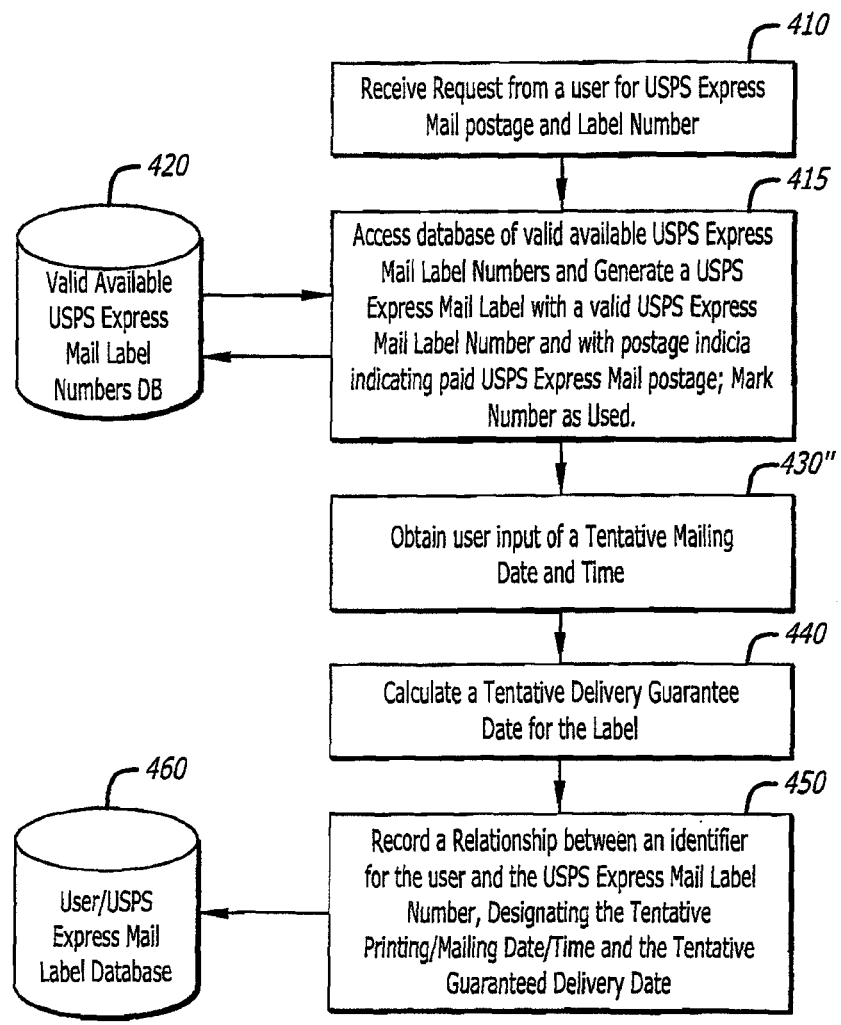

In yet another alternative exemplary embodiment, as depicted in alternative exemplary process 430" in FIG. 4C, the exemplary Internet postage provider computer system would comprise program code operable for obtaining the tentative mailing date and time from the user.

Figure 5A:
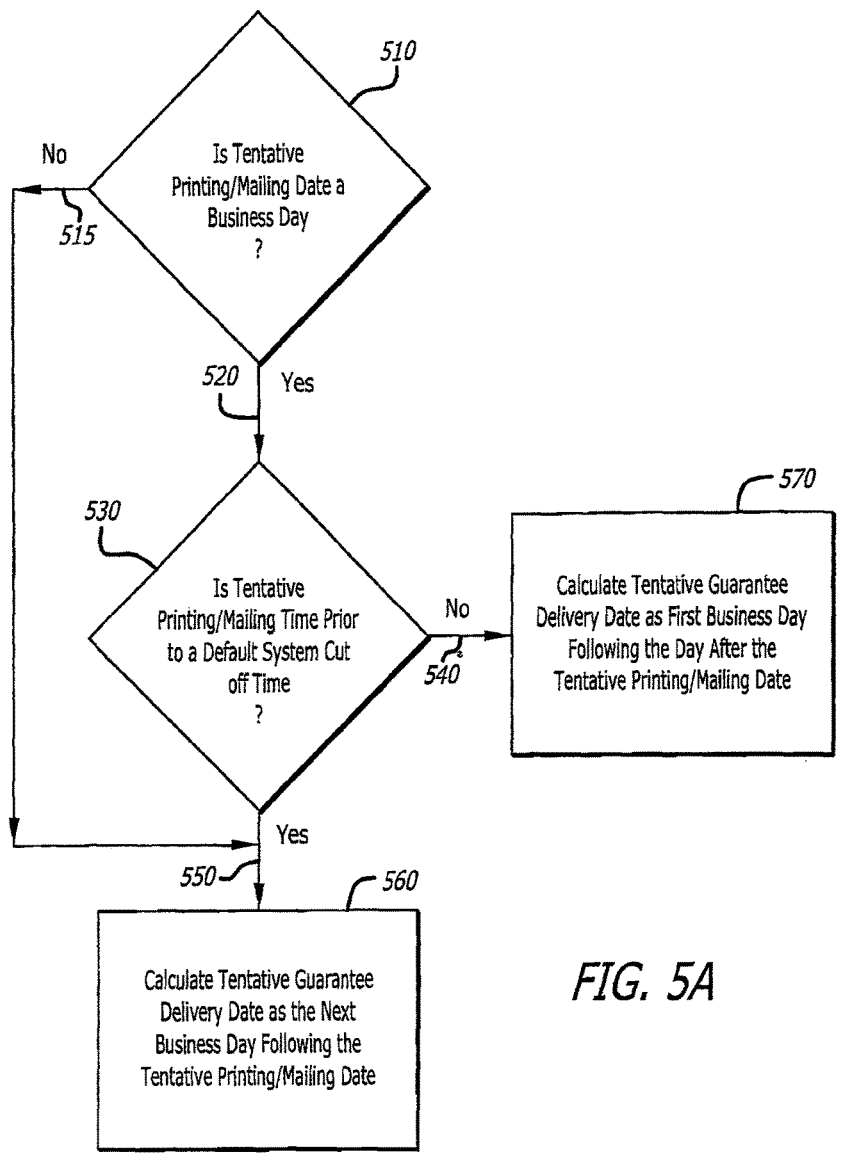
FIG. 5A is a flow diagram depicting exemplary high level logic functions for calculating a tentative guaranteed delivery date in an exemplary embodiment of the present invention.

Returning with reference to the exemplary embodiment depicted in FIG. 4A, then, as depicted in exemplary process 440, the exemplary Internet postage provider computer system would calculate a tentative delivery guarantee date for the label. FIG. 5A depicts exemplary high level logic functions of an exemplary process for calculating a tentative guarantee delivery time.

As depicted in FIG. 5A, as depicted in exemplary test function 510, the tentative printing/mailing would be tested to determine if the date fell on a business day. If, as depicted by exemplary "No" path 515, the tentative printing/mailing date fell on a day of the week when Post Offices are closed, such as, for example, a Sunday, or a federal holiday, then the exemplary Internet postage provider computer system would determine, as depicted in exemplary process 560, a tentative guarantee delivery date as the next business day. If, as depicted by exemplary "Yes" path 520, the tentative printing/mailing date was determined to be a regular business day, then, as depicted in exemplary test function 530, the tentative printing/mailing time would be tested to determine whether the tentative printing/mailing time falls prior to a default system cutoff time.

As depicted by exemplary "no" path 540, if the printing time was after a system-default pickup/cutoff time, then, as depicted in exemplary process 570, the exemplary Internet postage provider computer system would comprise program code operable for calculating a guaranteed delivery date that comprises the first business day following the day after the tentative printing/mailing date. If, on the other hand, as depicted by exemplary "Yes" path 550, the tentative printing/mailing date had been determined to be a regular business day (exemplary "Yes" path 520), and the tentative printing/mailing time fell prior to the system-default drop-off cutoff time, then the exemplary Internet postage provider computer system would determine, as depicted in exemplary process 560, a tentative guarantee delivery date as the next business day.

It will be understood by someone with ordinary skill in the art that the above-described processes would include consideration of circumstances where a tentative printing/mailing date fell on a regular business day but immediately preceded a two-day span when Post Offices would be closed, for example, a Saturday preceding a Sunday that would be followed by a federal holiday Monday. In such a case, if the tentative printing/mailing time fell after a system-default pickup cutoff time (exemplary "No" path 540), then, as depicted in exemplary process 570, the exemplary Internet postage provider computer system would comprise program code operable for calculating a tentative guaranteed delivery date as the first business day following the day after the tentative mailing date. If on the other hand, the tentative printing/mailing date fell prior to the default system cutoff time (exemplary "Yes" path 550), then, as depicted in exemplary process 560, the exemplary Internet postage provider computer system would comprise program code operable for calculating a guaranteed delivery date as the next business day following the tentative printing/mailing date.

It will be understood by someone with ordinary skill in the art that the above-mentioned way for calculating a tentative guarantee delivery date is illustrative and non-limiting.

Exemplary ways for calculating a tentative USPS Express Mail guarantee delivery date are described herein. For other mail classes, or possibly, for USPS Express Mail at some point in the future, other factors may be involved in calculating a guarantee delivery date. For example, origin address information, origin zone information, destination address information, destination zone information, and/or mail class, and/or other factors, including, for example, the weight and/or dimensions of the item, and/or the date and time the item is received by the postal service and officially entered into the mail stream (i.e., a mailing date and time), and/or the relevant drop-off cutoff time for the postal location, possibly with relevance to other of the above-mentioned factors, for example, mail class. For example, a postal location could have a first drop-off cutoff time for Express Mail, and a second drop-off cutoff time for Priority Mail. It will be understood by someone with ordinary skill in the art that consideration of the above-mentioned factors would not depart from the spirit of the present invention. In one embodiment, a guarantee delivery date could be determined for a particular item based on one or more of: origin address information, origin zone information, destination address information, destination zone information, mail class, mailing date, mailing time, and postal drop-off location cutoff time. As mentioned above, in some embodiment, postal drop-off location cutoff times could be mail-class-specific. As will be understood by someone with ordinary skill in the art, the calculation of a guarantee delivery date based on the above-mentioned additional factors, and the monitoring of scanned data to determine actual entry into the mail stream and/or actual delivery and/or absence of scanning of actual delivery, would be similar to the processes described herein for USPS Express Mail.

A further alternative exemplary embodiment could instead, display an online question to the requesting user, asking the user if the user will drop off the parcel prior to the pickup cutoff time for the post office to which the parcel will be provided. If the user indicates that the item will not be provided to the post office prior to the post office's pickup cutoff time, (i.e., "no"), then the alternative exemplary Internet postage provider computer system would comprise program code operable for calculating a guaranteed delivery date two (2) days after the mailing date. If the user indicates that the item will be provided to the post office prior to the post office's pickup cutoff time, (i.e., "yes"), then the alternative exemplary Internet postage provider computer system would comprise program code operable for calculating a guaranteed delivery date one (1) day after the mailing date.

Figure 4D:
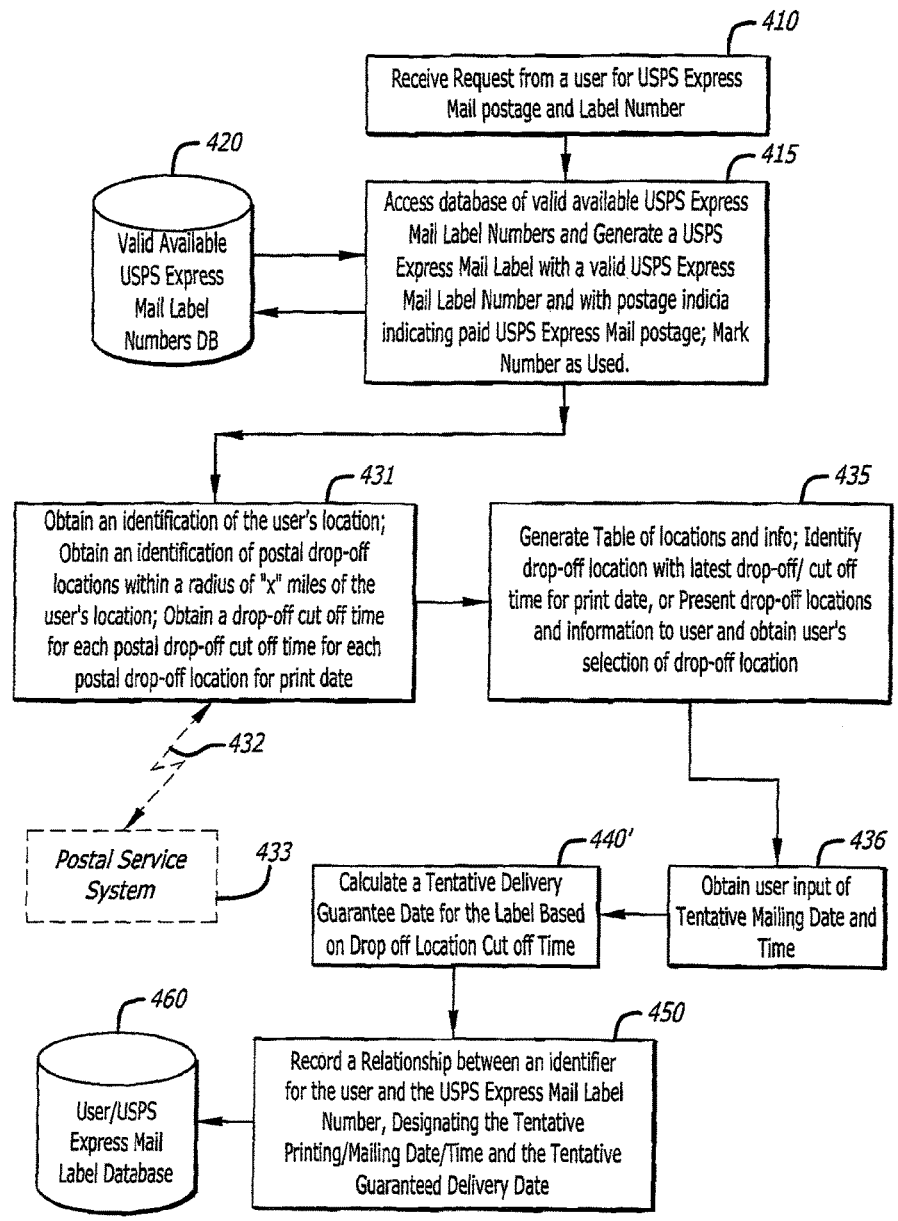

As a further alternative, a further alternative exemplary embodiment, as depicted for example in FIG. 4D, would comprise program code operable for obtaining, as depicted in exemplary process 431, or otherwise associating with the requesting user, a postal code relating to a location of the requesting user. Such further alternative exemplary embodiment would comprise program code operable for obtaining, as depicted for example in exemplary process 431, or otherwise determining an identification of postal drop-off locations within a certain radius of "X" miles, for example, within a 2-mile, 5-mile, or other, radius, of the postal code relating to the location of the particular user. One such embodiment would determine the postal drop-off locations by making an Application Program Interface ("API") call (see, e.g., optional element 432) to an exemplary postal service system (see, e.g., optional element 433) and requesting identification of postal drop-off locations within a certain radius of the user's location. In such an embodiment, the exemplary postal service system (see, e.g., optional element 433) would return to the exemplary embodiment, the information requested. An exemplary API call to obtain postal drop-off locations would provide, for example, an origination ZIP code (that is, the postal code associated with the user's location), a destination ZIP code (associated with the delivery address for the postal item), and a shipping date. The exemplary embodiment would identify or otherwise determine a postal code associated with the user's location. The exemplary embodiment would identify or otherwise determine a destination postal code associated with the delivery address for the postal item. Further, as described elsewhere herein, the exemplary embodiment would identify or otherwise determine a shipping date, such as a tentative mailing date.

Providing in an exemplary API call, an origination postal code, a destination postal code and a tentative mailing date, the exemplary API call would result in an exemplary API response that would provide:
the origination postal (e.g., ZIP) code, city, and state,
the destination ZIP code, city, and state, and
a set of exemplary commitments.
Each exemplary commitment would comprise:
a commitment type name (e.g, "Next Day")
a commitment delivery time,
a time of day/relative day commitment code, e.g., to identify the commitment as being for:
next day by 10 am,
next day by 12 pm,
next day by 3 pm,
two days, or
two delivery days; and
an exemplary set of drop-off locations, each of which would comprise:
a cutoff time,
a facility name,
a street address,
a city,
a state, and
a postal (e.g., ZIP) code An exemplary Express Mail Service Commitments API request is depicted in FIG. 12. An exemplary Express Mail Service Commitments API response is depicted in FIG. 13.

In other embodiments, instead of an API call to a postal service system, a table of such drop-off locations could be made available in a computer accessible memory, accessible by the computer system of the embodiment.

Once the postal drop-off locations within the certain radius had been identified, the further alternative exemplary embodiment would comprise program code operable for obtaining, as depicted in exemplary process 431, or otherwise determining, information associated with each postal drop-off location within the relevant radius of the user's location. Exemplary drop-off location information that would be obtained by the embodiment would comprise, for example, a drop-off cutoff time for each postal drop-off location. Other exemplary drop-off location information that could be obtained by the embodiment would further comprise, for example, address information, and/or a map, or a hypertext link to a map, of the location of each postal drop-off location.

Once the information for each postal drop-off location within the relevant radius of the requesting user's location had been obtained, the further alternative exemplary embodiment would comprise program code operable for generating, as depicted in exemplary process 435, a table, or other structure or organization, of information comprising each of the postal drop-off locations within the relevant radius. An exemplary table of information for the relevant postal drop-off locations would comprise, for example, for each postal drop-off location, a drop-off cut-off time by which an item would be guaranteed for delivery within a certain guaranteed delivery time. Such an exemplary table of information for the relevant postal drop-off locations could further comprise, for example, for each postal drop-off location, address information for the relevant postal drop-off location and/or a map of the location, and/or a hypertext link to a map of the location. In one embodiment, program code would be operable to obtain a map, or a hypertext link to a map, for each address for each relevant postal drop-off location.

In one exemplary embodiment, as further depicted in exemplary process 435, program code would be operable to analyze the information in the exemplary table and identify, or otherwise determine, a drop-off location from the drop-off locations in the table, that has the latest drop-off cutoff time relevant to the print date of the postage indicia and Express Mail label.

In another embodiment, as depicted in exemplary process 435, program code would be operable to present the drop-off locations in the relevant radius, and the information associated with each, to the user. In one exemplary embodiment, program code would be operable to generate a display of the table of information for the locations, including an identification of each drop-off location, the associated cut-off time, and/or address and/or map information and would facilitate the display of the table to a display device associated with a computer accessible by the user. In another exemplary embodiment, program code would be operable to generate a map of the drop-off locations, and to generate in association with each drop-off location, an indication, such as an icon containing text, of the drop-off cutoff time for the relevant location.

FIG. 4E depicts an exemplary map 480 of drop-off locations generated by an exemplary embodiment, depicting various drop-off locations 481-484, and a respective information icon 491-494 associated with each respective drop-off location 481-484. In the exemplary map 480, exemplary drop-off location information icon 493 is depicted as enlarged as compared to the other exemplary drop-off location information icons 481-482 and 484, depicting the latest cutoff time, 7 pm; exemplary drop-off location information icon 494 is depicted as enlarged as compared to other exemplary drop-off location information icons 481-482, depicting the second latest cutoff time, 6 pm. An exemplary user location 485 is depicted with an exemplary "You are here" icon 486, depicting the location of the user.

It will be understood by someone with ordinary skill in the art that alternative ways of reporting and/or displaying location information of drop-off locations and drop-off location information could be provided. For example, each drop-off location could be separately mapped.

Returning with reference to FIG. 4D, exemplary program code, as depicted in exemplary process 436, would be operable to request from the user, and obtain an input by the particular user, of a tentative mailing date and time. In one embodiment, the user would be prompted to select one of the postal drop-off locations from an exemplary map, table or other display of the postal drop-off locations, and input a tentative mailing date and time. In other embodiments, as mentioned above, the embodiment would identify the latest cut-off time for a drop-off location and would make a system default assumption that the user would use that drop-off location; the embodiment would obtain the user's input of a tentative mailing date and time.

As depicted in process 440' in FIG. 4D, program code would be operable to calculate a tentative delivery guarantee date for the label based on the drop-off location cutoff time. As was previously described above, in one embodiment, the drop-off location cutoff time would have been determined by the exemplary system as the latest cutoff time for the relevant drop-off locations. In another location, as was described above, the drop-off location cutoff time would be determined according to a selection or other input by the user of a drop-off location.

As was described above, the tentative mailing date and time may have been a determination by the exemplary system of: the printing date and time; some amount of time added to the printing date and time; an input by user, or by some other way. FIG. 5A was previously described above with respect to a determination of a tentative guarantee delivery date based on a default system cutoff time and a printing date and time as the tentative mailing date and time. As will be understood by someone with ordinary skill in the art, the printing date and time will, for some embodiments, be the current date and time.

Figure 5B:
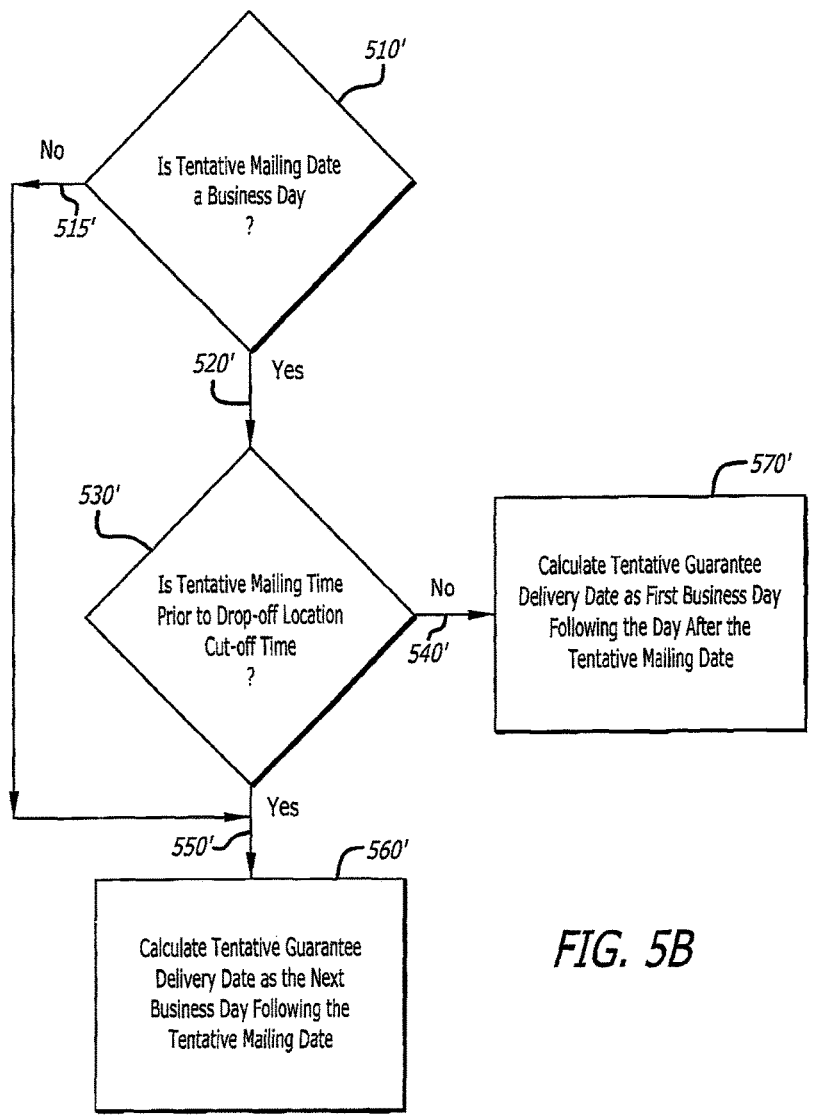
FIG. 5B is a flow diagram depicting exemplary high level logic functions for calculating a tentative guaranteed delivery date in alternative exemplary embodiments of the present invention.

As described above, the tentative mailing time may have been assumed by an exemplary embodiment to be the printing time. In another embodiment, the tentative mailing time may have been input by the user. FIG. 5B depicts determining in exemplary test process 510' whether the tentative mailing date is a business day. If so (exemplary "Yes" path 520'), then in exemplary test process 530', program code would be operable to compare the tentative mailing time to the drop-off location cutoff time to determine whether the tentative mailing time is prior to the drop-off location cutoff time. As was described above, the drop-off location cutoff time could be a system default, or could be a latest drop-off cutoff time that was determined by the system according to relevant drop-off locations, or could be a drop-off cutoff time for a particular drop-off location that was selected by the user.

If the tentative mailing time is not prior to the relevant drop-off location cutoff time (exemplary "No" path 540'), then as depicted in exemplary process 570', program code would be operable to calculate a tentative guarantee delivery date as the first business day following the day after the tentative mailing date.

If the tentative mailing time is prior to the relevant drop-off location cutoff time (exemplary "Yes" path 550'), or if the tentative mailing date was not a business day (exemplary "No" path 515'), then as depicted in exemplary process 560', program code would be operable to calculate a tentative guarantee delivery date as the next business day following the tentative mailing date.

Returning with reference to FIGS. 4A, 4B, 4C and 4D, once the tentative delivery guarantee date had been calculated as depicted in exemplary process 440 and/or 440', and as was discussed in more detail with reference to FIGS. 5A and 5B, the exemplary Internet postage provider computer system would record, as depicted in exemplary process 450, a relationship between the USPS Express Mail Label Number and an identifier that identifies the requesting user; an indication of the determined tentative printing/mailing date and the calculated tentative guaranteed delivery date would be also recorded. As depicted in FIGS. 4A, 4B, 4C and 4D, the above-mentioned recording of a relationship between the USPS Express Mail Label Number and a user identifier, would be a recording on a computer-accessible memory, such as, for example, on exemplary User/USPS Express mail Label Data Base 460.

In the exemplary embodiment, at the time an entry is added to the User/USPS Express Mail Label data base 460, the entry would be marked by the exemplary Internet postage provider computer system as active for tracking purposes.

In other exemplary embodiments, other ways could be used to facilitate tracking. For example, one alternative exemplary embodiment of the Internet postage provider computer system would comprise program code operable for creating an exemplary separate list of USPS Express Mail Label Numbers with the respective tentative mailing/printing dates (the "USPS Express Mail List") and the respective exemplary calculated tentative guarantee delivery dates. It will be understood by someone with ordinary skill in the art that the above-mentioned alternative creation of an entry on a separate list of USPS Express Mail Label Numbers is illustrative and not a limitation of the invention.

As a further alternative, a further alternative exemplary Internet postage provider computer system could flag USPS Express Mail Label Numbers for tracking in a database of printed postage indicia and could use that printed postage database to facilitate tracking.

After the USPS Express Mail Label is printed, the exemplary Internet postage provider computer system would access USPS scan event data to refine its determination of a mailing date and time, and to refine its calculation of a guarantee delivery date as described further below.

Figure 6:
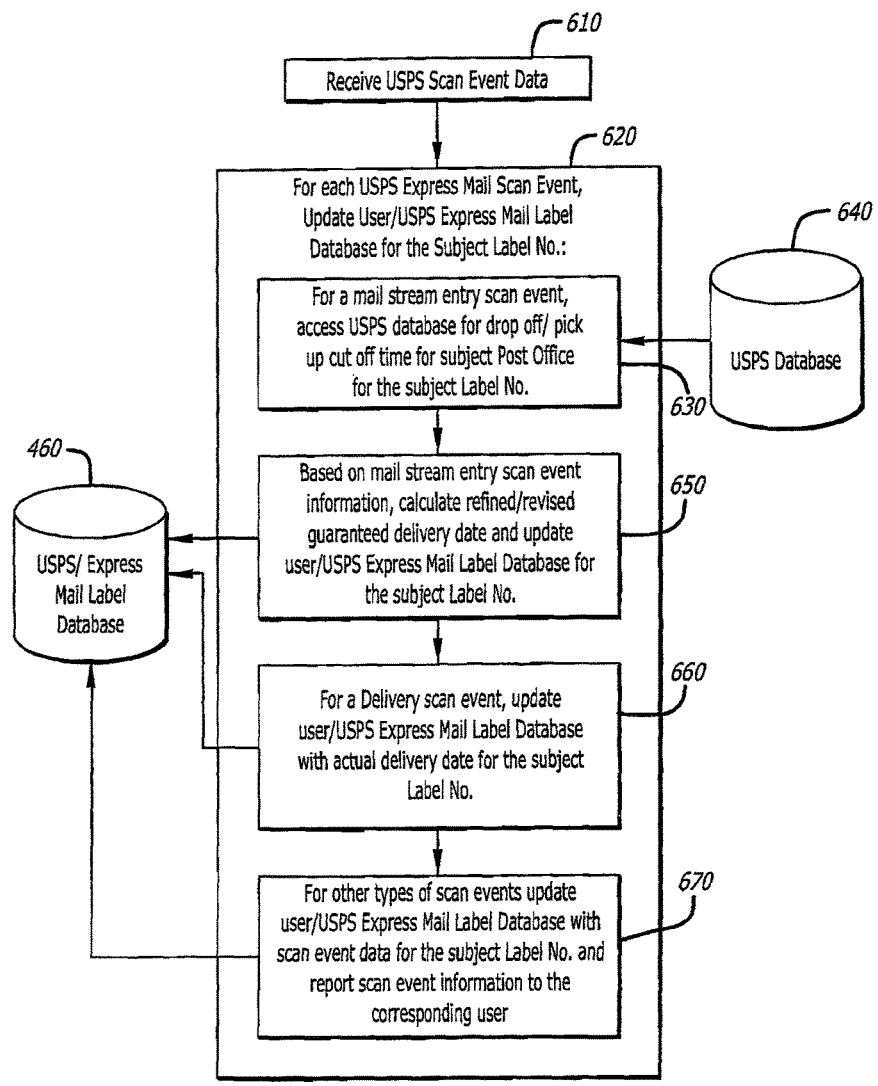
FIG. 6 is a flow diagram depicting exemplary high level logic functions for updating a user/USPS Express Mail Label data base with scan event data in an exemplary embodiment of the present invention.

In the exemplary embodiment, as depicted in exemplary process 610 in FIG. 6, the USPS will make available to, and the exemplary Internet postage provider computer system will receive, in a computer readable form, scan event information for scanning events for parcels bearing postage indicia, delivery address information, mailing tracking information, and/or USPS Express Mail Label Numbers generated by the exemplary Internet postage provider computer system.

For example, the USPS may make scan event information available to the exemplary Internet postage provider computer system a certain number of times per day. The USPS may refresh a website, or information at an Internet address, with new scan event information a certain number of times per day. The USPS website, or Internet address, would be available according to a security protocol that would allow the exemplary Internet postage provider computer system to access scan event information for parcels bearing postage indicia, delivery address information, mailing tracking information, and/or USPS Express Mail Label Numbers generated by the exemplary Internet postage provider computer system. Alternatively, the USPS could send the exemplary Internet postage provider computer system a data set comprising scan event information for parcels bearing postage indicia, delivery address information, mailing tracking information, and/or USPS Express Mail Label Numbers generated by the exemplary Internet postage provider computer system.

Figure 7:
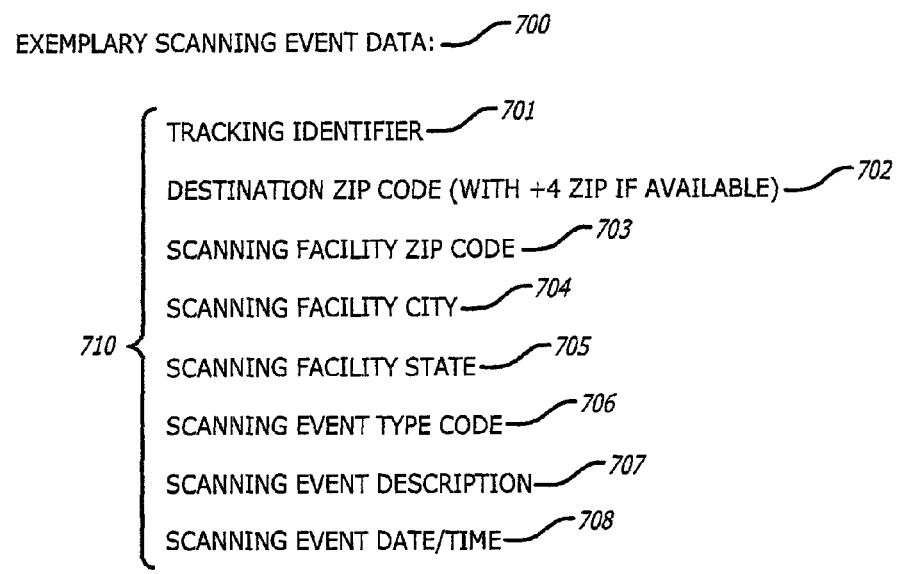
FIG. 7 shows an exemplary listing of information in a USPS scan event data record for scanned items in an exemplary embodiment of the present invention.

FIG. 7 shows exemplary information in a USPS scan event data record for scanned items. As depicted in FIG. 7, an exemplary scan event data record 710 from the USPS would comprise exemplary scan event data 700, for example, a tracking identifier 701, such as, for example, a Delivery Confirmation identifier, a Signature Confirmation identifier, or an Express Mail identifier. As depicted in FIG. 7, an exemplary scan event data record 710 from the USPS would further comprise an exemplary Destination Zip Code (with a +4 Zip code, if available) 702, an exemplary Scanning Facility Zip Code 703, and exemplary Scanning Facility City 704, an exemplary Scanning Facility State 705, an exemplary Scanning Event Type Code 706, an exemplary Scanning Event Description 707, and an exemplary Scanning Event Date and Time 708.

With reference to FIG. 6, as depicted in exemplary process 620, the exemplary Internet postage provider computer system would comprise program code operable for checking each scanning event, and for each scanning event encountered for a USPS Express Mail Label, updating the relevant information in the user/USPS Express Mail Label data base.

It will be understood by someone with ordinary skill in the art that when a USPS Express Mail item is dropped off at a USPS Post Office, the USPS Express Mail Label is often, but not always, scanned. Such a scanning event would show the date and time that the USPS Express Mail item actually entered the mail stream and would show the location, that is, the actual Post Office, where the item entered the mail stream. As depicted in exemplary process 620, the exemplary Internet postage provider computer system would comprise program code operable to update the user/USPS Express Mail Label data base with the actual mailing date and time from such a mail stream entry scan event.

As depicted in exemplary process 630, the exemplary Internet postage provider computer system would comprise program code operable to query a USPS database 640 that would contain an indication of a drop off/pickup cutoff time for the particular post office where the item was delivered into the mail stream. As depicted in exemplary process 650, the exemplary Internet postage provider computer system would comprise program code operable for calculating a refined guaranteed delivery date based on the scanned entry of the item into the mail stream in a manner similar to that previously described above with respect to FIG. 5A for calculating a tentative guaranteed delivery date, except that instead of using the printing date and time as the tentative mailing date and time, the actual mailing date and time, based on the scan event data, would be used.

For a scan event that indicates delivery of a particular item, as depicted in exemplary process 660, the exemplary Internet postage provider computer system would comprise program code operable to update the user/USPS Express Mail Label data base with the actual delivery date for the item.

Figure 8:
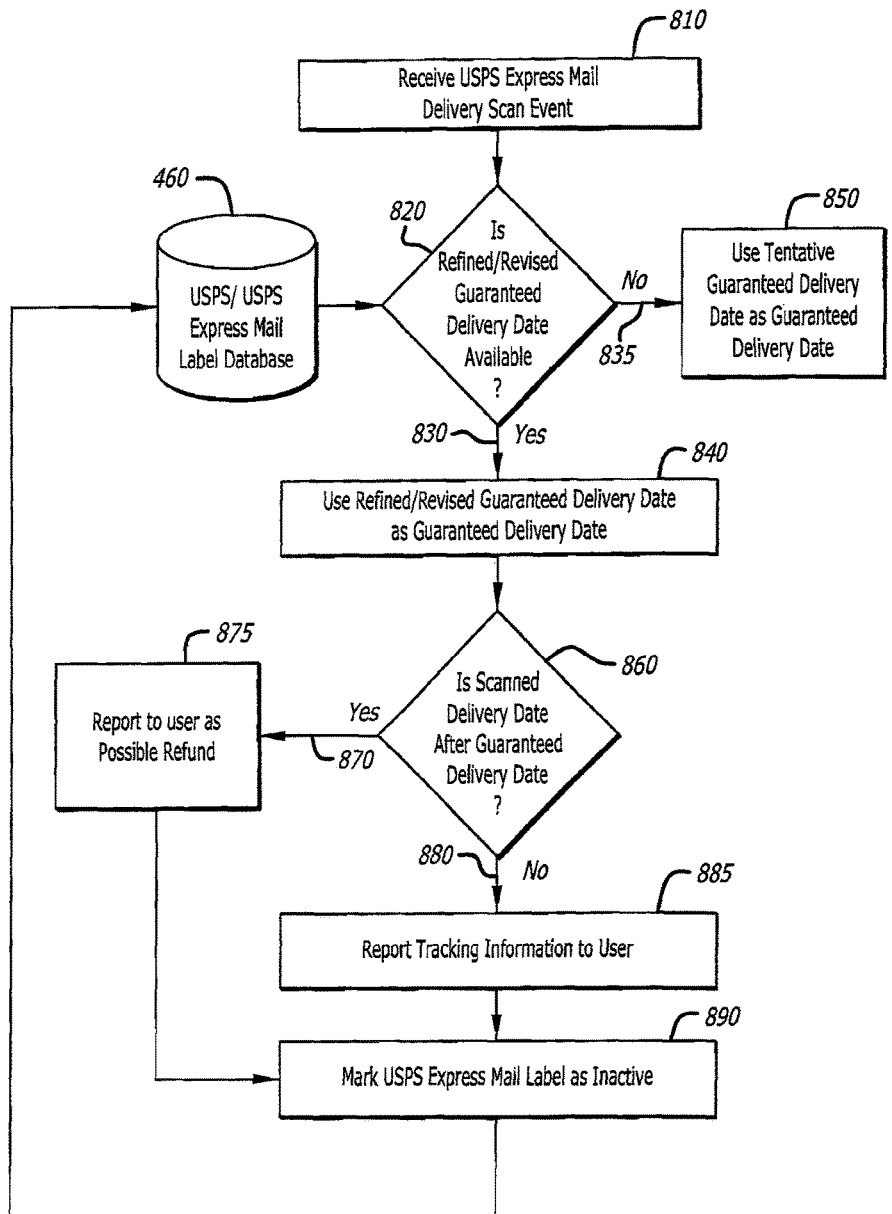
FIG. 8 is a flow diagram depicting exemplary high level logic functions for comparing the best guaranteed delivery date available to an actual delivery date in an exemplary embodiment of the present invention.

FIG. 8 depicts exemplary high level logic functions for an exemplary analysis of USPS delivery scan events. As depicted in exemplary process 810, USPS Express Mail delivery scan events will be received and analyzed. As described further below, the exemplary Internet postage provider computer system would comprise program code operable to use the best available guaranteed delivery date for an item in the user/USPS Express Mail Label data base to compare to the actual delivery date to determine whether the item was delivered before the expiration of the calculated guaranteed delivery date. In particular, the user/USPS Express Mail Label information corresponding to a USPS Express Mail delivery scan event would be checked, as depicted in exemplary test process 820, to see if a refined guaranteed delivery date is available. If a refined guaranteed delivery date is available (exemplary "Yes" path 830), then, as depicted in exemplary process 840, the refined guaranteed delivery date would be used as the guaranteed delivery date that is compared to the actual delivery date from the USPS Express Mail delivery scan event. If, on the hand, no refined guaranteed delivery date is available (exemplary "No" path, 835), then, as depicted in exemplary process 850, the tentative guaranteed delivery date would be used as the guaranteed delivery date that is compared to the actual delivery date.

As depicted in exemplary test function 860, the guaranteed delivery date would be compared to the USPS Express Mail scanned delivery date. If the USPS Express Mail scanned delivery date falls after the guaranteed delivery date (exemplary "Yes" path 870), then the exemplary Internet postage provider computer system would further comprise program code operable for providing a notification, as depicted in exemplary reporting process 875, to report to the user, or otherwise provide access to the user regarding the status of, a suspected or apparent delivery guarantee failure with an indication that the user may be eligible for a refund for the apparent failure of the USPS to deliver the item by the guaranteed delivery date; and, as depicted in exemplary process 890, the exemplary Internet postage provider computer system would further comprise program code operable for marking the corresponding item in the user/USPS Express Mail Label database as no longer active.

In such case (for a suspected or apparent delivery guarantee failure), the exemplary Internet postage provider computer system would further comprise program code operable for providing the user, as depicted in FIG. 9, with access to information concerning the delivery guarantee failure status, comprising, for example, an online printable display of a receipt of payment for the relevant USPS Express Mail postage indicia and an online printable display of a report indicating that the item had not been delivered by the guaranteed delivery date that was calculated by the system.

In one alternative exemplary embodiment, instead of a user paying upfront for postage, the user inputs, or otherwise indicates, to the Internet postage provider system, a request for computer-based postage indicia; the Internet postage provider would pay upfront for the postage and then bill the user, at some point, for the postage amount. In such an embodiment, such an approach of the Internet postage provider paying upfront for the postage could be used for certain, but not all, users. For example, the Internet postage provider could choose, for selected users, to pay upfront for postage for that user and then bill the user; for other users, the users would need to pay upfront for that user's postage.

In such an embodiment where the Internet postage provider would pay upfront for the postage for some, or all, of its users, the exemplary Internet postage provider system, upon identifying a guarantee delivery failure and an associated refund entitlement, would determine the status of payment for the postage. In such an embodiment, for example, if the Internet postage provider had paid upfront for the postage, and if the Internet postage provider had not yet billed the relevant user, then the Internet postage provider could seek a refund, for example, through electronic data interchange ("EDI") or with a hardcopy-based refund request, to the account of the Internet postage provider. In such an embodiment, for example, if the Internet postage provider had paid upfront for the postage, and had already billed the relevant user, but had not yet received payment, then the exemplary Internet postage provider system could notify the user to adjust the bill and the Internet postage provider could seek a refund to the account of the Internet postage provider, for example, through electronic data interchange ("EDI") or with a hardcopy-based refund request. In such an embodiment, for example, if the Internet postage provider had paid upfront for the postage, had already billed the relevant user and had already received payment, then the exemplary Internet postage provider system would notify the user regarding the refund entitlement and would notify the user of an opportunity for the user to seek a refund in ways discussed further herein.

In such an embodiment where the Internet postage provider would pay upfront for the postage for some, or all, of its users, the exemplary Internet postage provider system would associate a postal item with a request by a user for computer-based postage indicia, as compared to an upfront payment by the user for the requested computer-based postage indicia.

In an embodiment in which the user pays upfront for computer-based postage indicia, the exemplary Internet postage provider system would associate a postal item with a request by a user for computer-based postage indicia, and/or with an upfront payment by the user for the requested computer-based postage indicia.

Returning with reference to FIG. 8, if, as depicted in exemplary "No" path 880, the USPS scanned Express Mail delivery date does not fall after the guaranteed delivery date, then the exemplary Internet postage provider computer system would further comprise program code operable for reporting, or otherwise providing access to, successful delivery status information to the user, regarding delivery of the item by the guaranteed delivery date; and, as depicted in exemplary process 890, the exemplary Internet postage provider computer system would further comprise program code operable for marking the corresponding item in the user/USPS Express Mail Label database as no longer active.

The exemplary Internet postage provider computer system would further comprise program code operable for periodically removing items that were no longer active from the user/USPS Express Mail Label database. It will be understood that periodic removal of inactive items from the user/USPS Express Mail Label database is not a limitation of the invention. Rather, an alternative exemplary Internet postage provider computer system could comprise program code operable for immediately removing from the USPS Express Mail List each item for which a delivery scan event is located in the USPS scan information.

In analyzing the USPS scan information for an item in the USPS Express Mail List, if a USPS scan event is encountered for an item, but the scan information does not indicate delivery, the exemplary Internet postage provider computer system would further comprise program code operable for reporting (depicted illustratively in exemplary process 670 in FIG. 6) the scan information to the user for informational purposes.

Figure 10:
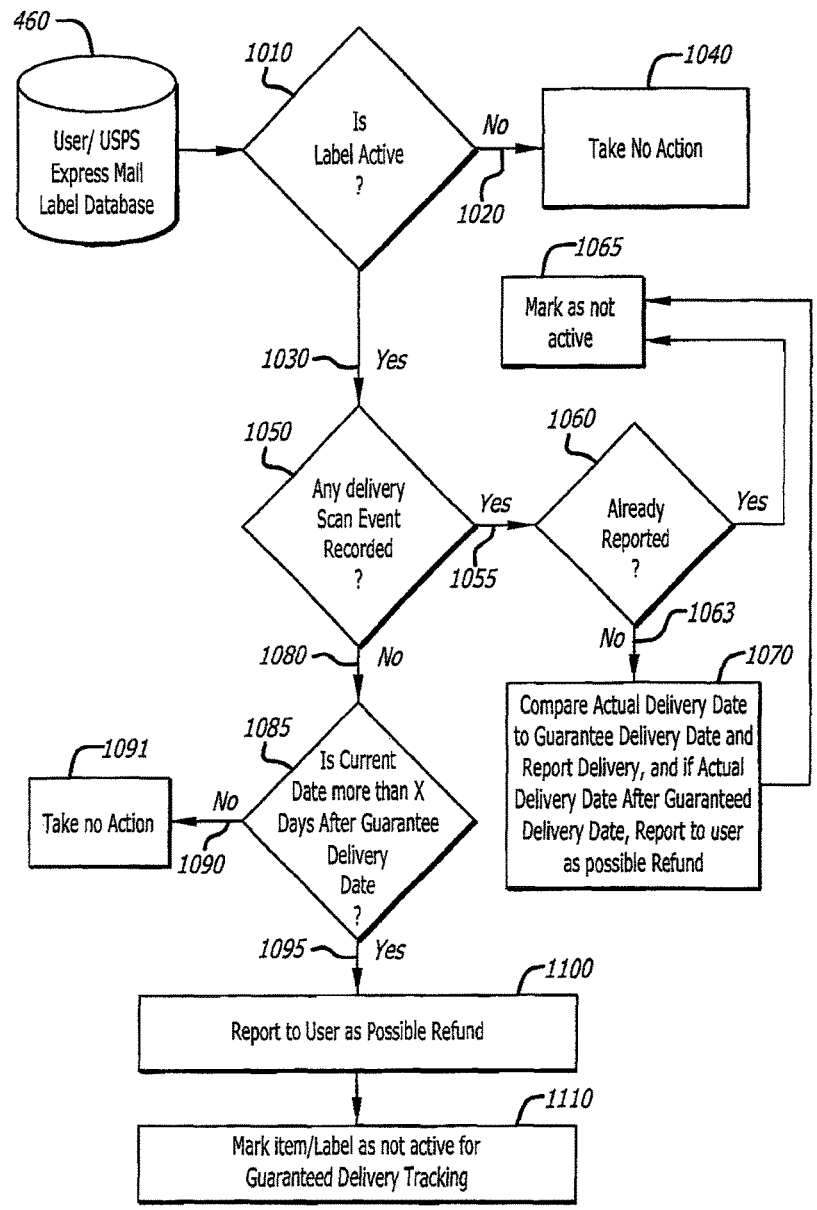
FIG. 10 is a flow diagram depicting exemplary high level logic functions for monitoring the exemplary user/USPS Express Mail Label database for failed guaranteed delivery and reporting failures to the corresponding user for refund, in an exemplary embodiment of the present invention.

The exemplary Internet postage provider computer system would further comprise program code operable for periodically analyzing each item in the user/USPS Express Mail Label data base. With reference to FIG. 10, as depicted in exemplary test function 1010, each item in the user/USPS Express Mail Label data base will be checked periodically to see if it is active. If the item is not active (exemplary "No" path 1020), then as depicted in exemplary process 1040, no action will be taken regarding that item.

If, on the other hand, the item is active (exemplary "Yes" path 1030), then as depicted in exemplary test function 1050, the item will be examined to determine whether or not any USPS Express Mail delivery scan event has been encountered and recorded for the item. If a USPS Express Mail delivery scan event had previously been recorded for the item (exemplary "Yes" path 1055), then the item would be examined as depicted in exemplary test function 1060 to determine whether the USPS delivery scan event had previously been reported to the user. If the USPS delivery scan event had previously been reported to the user (exemplary "Yes" path 1062), then, as depicted in exemplary process 1065, the item would be marked as inactive.

If the USPS delivery scan event had not previously been reported to the user (exemplary "No" path 1063), then, as depicted in exemplary process 1070, the exemplary Internet postage provider computer system would further comprise program code operable for comparing the actual delivery date to the guaranteed delivery date and reporting the delivery, and if the delivery had not been performed before the expiration of the guaranteed delivery date, reporting the delivery guarantee failure; the item would then, as depicted in exemplary process 1065, be marked as inactive. For the reasons previously explained above, the guaranteed delivery date may have been calculated based on either the tentative mailing date and time (if no scan event had been received for the item indicating entry into the mail stream), or may have been updated with an actual scanned mailing date and time.

If no USPS Express Mail delivery scan event had been encountered and recorded for the item (exemplary "No" path 1080), then the exemplary Internet postage provider computer system would further comprise program code operable for comparing, as depicted in exemplary test function 1085, the guaranteed delivery date for the item with the current date.

As will be understood by someone with ordinary skill in the art, it would be possible for delivery of USPS scan event data to an Internet postage provider to sometimes be delayed. Therefore, in analyzing the user/USPS Express Mail Label database, the exemplary Internet postage provider computer system will provide for additional time, for example, "X" number of days, in which to receive USPS scan event data before reporting an item as undelivered. Accordingly, if the current date exceeds the guaranteed delivery date for the item by more than some period of time, for example, "X" number of days (exemplary "Yes" path 1095), where "X" days might be, for example, two (2) days, then the exemplary Internet postage provider computer system would further comprise program code operable for providing, as depicted in exemplary reporting process 1100, a notification to the user that the user may be eligible for a refund for the apparent failure of the USPS to deliver the item by the guaranteed delivery date.

In particular, in such case, the exemplary Internet postage provider computer system would further comprise program code operable for providing the user, as depicted, for example, in FIG. 9, with an online printable display of a receipt of payment for the relevant USPS Express Mail postage indicia and an online printable display of a report indicating that the item was not delivered by the calculated guaranteed delivery date.

If the current date does not exceed the guaranteed delivery date for the item by more than the period of time of, for example, "X" number of days (exemplary "No" path 1090), then as depicted in exemplary process 1091, the exemplary Internet postage provider computer system would take no further action at that point for the particular item.

Guaranteed Delivery tracking and reporting is described above for the exemplary embodiment with respect to USPS Express Mail. However, it will be understood by someone with ordinary skill in the art that the invention herein described will apply equally to each and every mail class for which the USPS provides, now or in the future, a guarantee of delivery by a certain guarantee delivery time period relevant to a mailing date. In an embodiment that provides guaranteed delivery tracking and reporting for multiple mail classes, the subject mail class for the relevant item would be indicated in the database; the system of such an embodiment would comprise program code operable to determine the mail class of each item, would determine the relevant guarantee delivery time period for the subject mail class, and would calculate a guarantee delivery date for the item based on the relevant guarantee delivery time period for the subject mail class.

Presently, the USPS does not provide for Electronic Data Interchange ("EDI") regarding claims for Express Mail Postage due to failed delivery or delivery falling after the guaranteed delivery date. Rather, an individual must go to the post office, provide a receipt as evidence of payment and request a refund.

However, in the future, instead of merely reporting the delivery guarantee failures to a user, a further alternative embodiment could provide automatic refund requests to the USPS. For example, a further alternative embodiment of the Internet postage provider computer system could comprise program code operable to directly provide an electronic record to the USPS of each failed delivery; each electronic failed delivery report would comprise an electronic representation of a receipt of payment for the relevant postage, and refund information for the relevant user. One exemplary further alternative embodiment would also provide as part of each electronic failed delivery report, an authorization by the user to the Internet postage provider, or to a third party, to request a refund from the USPS on the user's behalf.

The exemplary Internet postage provider computer system of such a further alternative embodiment would optionally comprise program code operable to charge a fee, or a percentage of any amount refunded, for providing the automated refund request service.

The exemplary Internet postage provider computer system of such a further alternative embodiment would comprise program code operable for reporting the failed delivery guarantee to the user as depicted in FIG. 11 and for requesting authorization from the user to perform an automatic refund request, as depicted in exemplary indicator element 1120. If the user declined the request for authorization, the exemplary Internet postage provider computer system would comprise program code operable to provide the user with the option of printing the printable display of the receipt for the postage and printing the printable display of the report of the failed delivery guarantee.

In one exemplary embodiment, the exemplary Internet postage provider computer system would comprise program code operable to provide the user with the option of printing a refund form with which to claim the refund; the exemplary Internet postage provider computer system would comprise program code operable to complete the refund form with information available to the exemplary Internet postage provider computer system, such as, for example, information regarding the user, and/or information regarding the postal item, including, for example, an identifier of the postal item, such as for example, a USPS Express Mail Label No., the postage indicia amount; the postage indicia print date; the mailing date, the guarantee delivery date, and the actual delivery date. In one embodiment, information regarding the postal item could also comprise a representation of an identifying and/or tracking bar code, such as, for example, a USPS Express Mail Label bar code.

If the user accepted the request for authorization, the exemplary Internet postage provider computer system of such a further alternative embodiment would comprise program code operable to receive an indication by the user of the user's authorization for proceeding with an automated refund request. The Internet postage provider computer system of such a further alternative embodiment would further comprise program code operable to generate an electronic record of a request for a refund, such as comprising information indicating receipt by the Internet postage provider computer system of such a further alternative embodiment of previous payment by the user for the relevant USPS Express Mail postage indicia (including, among other things, the USPS Express Mail Label No., the mailing date, the amount paid by the user, a scan event or scan event identifier showing the item entering the mail stream (if available)), information regarding the failed delivery guarantee, and an indication of the user's authorization for the Internet postage provider computer system of such a further alternative embodiment to receive the refunded amount.

The exemplary Internet postage provider computer system of such a further alternative embodiment would further comprise program code operable to receive refund request responses from the USPS. Denials by the USPS of refund requests would be reported to the user in a way much as was previously described with respect to FIG. 9, but with a report of the refusal by the USPS to provide a refund. The user would have the option of printing the printable receipt and report of failure and attempting to obtain a refund by using the manual presentation method previously described above.

Responses from the USPS indicating acceptance of a refund request would be reported to the user. When such an acceptance response is received from the USPS by the exemplary Internet postage provider computer system, the exemplary Internet postage provider computer system would comprise program code operable to credit the account of the user associated with the refund, by an amount reflecting the subtraction of either a flat fee or a percentage of the refunded amount, as the case may be, and would credit an account for the Internet postage provider with an amount reflecting either the flat fee of the percentage of the refunded amount, as the case may be.

In one such further alternative embodiment, the exemplary automated refund process could be performed by a third party instead of by the Internet postage provider. In such case, the exemplary Internet postage provider computer system could report the delivery failure to the user and request that the user provide authorization to the third party to make the refund request. The exemplary Internet postage provider computer system could then provide the third party with receipt information, failed delivery guarantee information, and the user's authorization to the third party to proceed to request a refund. The third party would then provide an electronic record of the information to the USPS and collect the refund should it be issued. The third party could charge the user a fee or a percentage of the refunded amount. The third party could also charge the Internet postage provider computer system a fee, such as for providing the service to the users of the Internet postage provider. Alternatively, the third party could pay a fee or a percentage of the refunded amount to the Internet postage provider for the authorization to collect the refunded amounts.

One exemplary embodiment would provide program code operable to record in a computer-accessible memory detail and summary information regarding each guarantee delivery failure, including, for example, whether the relevant guarantee failure was a certain failure (based on both scanned mail system entry information and based on scanned delivery information) or a suspected failure (based on either a tentative guarantee delivery date and/or an absence of any scanned delivery information following either a tentative guarantee delivery date and/or a calculated guarantee delivery date based on a mail stream entry scan event. Such an exemplary embodiment would provide program code operable to record in a computer-accessible memory detail and summary information regarding, for example, the postage amount associated with each guarantee delivery failure (both certain and suspected, and the status of reporting of the guarantee delivery failure to the relevant user. Such an exemplary embodiment would provide a report to the relevant user, such as with an online display, of a refund total (and/or totals of certain refund entitlements and suspected refund entitlements), and if the user requested it, of refund detail, to which the user is, or may be, entitled. Refund detail could include, in addition to the postage amount, information regarding the sender, recipient address information, item weight, drop-off location (if available), insurance amounts, and/or other special services and amounts for which the user may have paid.

In some embodiments, the exemplary Internet postage provider computer system would comprise program code operable to credit a refund amount to the user's account only after a refund is actually received and/or recorded by the Internet postage provider computer system. In other embodiments, the exemplary Internet postage provider computer system would comprise program code operable to prepay/pre-credit a refund to the user's account after a refund request has been submitted. In still other embodiments, the exemplary Internet postage provider computer system would comprise program code operable to determine whether the guarantee delivery failure is a certain failure or a suspected failure; for certain failures, pre-pay/pre-credit the user's account with a refunded amount after the exemplary Internet postage provider computer system submits an electronic refund request to the postal service system; and for suspected failures, credit the user's account with the refunded amount only after the refunded amount is received and/or recorded by the exemplary Internet postage provider computer system. As was previously described above, credits in some embodiments of refund amounts to a user's account may reflect an adjustment by a fee credited to the account of the exemplary Internet postage provider.

Facsimile Reproduction of Copyright Material

A portion of the disclosure of this patent document contains material which is subject to copyright protection by the copyright owner, Stamps.com Inc. The copyright owner has no objection to the facsimile reproduction by anyone of the patent document or the patent disclosure, as it appears in the Patent and Trademark Office patent file or records, but otherwise reserves all copyright rights whatsoever.

ILLUSTRATIVE EMBODIMENTS

Although this invention has been described in certain specific embodiments, many additional modifications and variations would be apparent to those skilled in the art. It is, therefore, to be understood that this invention may be practiced otherwise than as specifically described. Moreover, to those skilled in the various arts, the invention itself herein will suggest solutions to other tasks and adaptations for other applications. Thus, the embodiments of the invention described herein should be considered in all respects as illustrative and not restrictive, the scope of the invention to be determined by the appended claims and their equivalents rather than the foregoing description.

What is claimed is:

1. A computer-based postage system comprising at least one computer device, said at least one computer device programmed to:
   receive through a communications network, a real-time request to said computer-based postage system from a user computer device for computer-based United States Postal Service postage indicia for mailing a particular postal item, said real-time request comprising an indication by a user through said user computer device to said computer-based postage system of information comprising:
      destination address information or destination zone information,
      a weight of said particular postal item or a particular packaging of said particular postal item,
      a mail class,
      a mailing date,
      a mailing time, and
      a postal drop-off location;
   search a computer-accessible memory for said postal drop-off location and obtain a postal drop-off cutoff time for said postal drop-off location; and
   in response to said real-time request, determine a guarantee delivery date guaranteed by the United States Postal Service for the United States Postal Service to deliver said particular postal item to a particular destination address according to said destination address information, or to a particular destination zone according to said destination zone information, according to said input by said user to said computer-based postage system and according to said postal drop-off cutoff time for said postal drop-off location.

2. The computer-based postage system of claim 1, said at least one computer device further programmed to:
   monitor digital records of scanned United States Postal Service event data recorded by the United States Postal Service for an occurrence of a United States Postal Service delivery scan event recorded by the United States Postal Service for said particular postal item;
   compare a delivery date associated with said United States Postal Service delivery scan event for said particular postal item, with the guarantee delivery date; and if the guarantee delivery date precedes the delivery date, automatically communicate an electronic refund request to the United States Postal Service.

3. The computer-based postage system of claim 1, said at least one computer device further programmed to:
    automatically detect a delivery guarantee failure; and
    in response to automatically detecting said delivery guarantee failure, automatically communicate an electronic refund request for an amount to the United States Postal Service.

4. The computer-based postage system of claim 3, said at least one computer device further programmed to:
    automatically facilitate a refund of said amount to an account associated with the user.

5. The computer-based postage system of claim 4, wherein said automatically facilitating a refund of said amount to said account associated with the user is provided by a third-party system.

6. The computer-based postage system of claim 5, wherein the third-party system charges the user a fee for refunding said amount.

7. The computer-based postage system of claim 5, wherein the third-party system charges an account associated with the computer-based postage system a fee for refunding said amount to the user.

8. The computer-based postage system of claim 5, wherein the third-party system charges the user a first fee for refunding said amount, and wherein the third-party system deposits a second fee to an account associated with the computer-based postage system for refunding said amount to the user.

9. The computer-based postage system of claim 1, wherein said guarantee delivery date comprises a tentative guarantee delivery date.

10. The computer-based postage system of claim 1, said at least one computer device further programmed to:
    determine as said guarantee delivery date, a refined guarantee delivery date according to actual scanned mailing date and time.

11. The computer-based postage system of claim 1, wherein said mailing date comprises a tentative mailing date based on an indicia print date, wherein said mailing time comprises a tentative mailing time based on an indicia print time, and wherein said guarantee delivery date comprises a tentative guarantee delivery date based on said tentative mailing date and said tentative mailing time.

12. A computer-based postage system comprising at least one computer device, said at least one computer device programmed to:
    determine a guarantee delivery date guaranteed by the United States Postal Service for the United States Postal Service to deliver a particular postal item to a particular destination address, or to a particular destination zone, according to an input by a user to said computer-based postage system and according to a postal drop-off cutoff time for a postal drop-off location indicated by the user;
    automatically detect a delivery guarantee failure, said delivery guarantee failure comprising an actual delivery date for said particular postal item that exceeds said guarantee delivery date; and
    in response to automatically detecting said delivery guarantee failure, automatically communicate an electronic refund request for an amount to the United States Postal Service.

13. The computer-based postage system of claim 12, said at least one computer device further programmed to:
    automatically facilitate a refund of said amount to an account associated with the user.

14. The computer-based postage system of claim 13, wherein said automatically facilitating a refund of said amount to said account associated with the user is provided by a third-party system.

15. The computer-based postage system of claim 14, wherein the third-party system charges the user a fee for refunding said amount.

16. The computer-based postage system of claim 14, wherein the third-party system charges an account associated with the computer-based postage system a fee for refunding said amount to the user.

17. The computer-based postage system of claim 14, wherein the third-party system charges the user a first fee for refunding said amount, and wherein the third-party system deposits a second fee to an account associated with the computer-based postage system for refunding said amount to the user.

* * * * *